United States Patent
Ogura et al.

(10) Patent No.: US 11,148,655 B2
(45) Date of Patent: Oct. 19, 2021

(54) TEMPERATURE CONTROL APPARATUS OF VEHICLE

(71) Applicant: TOYOTA JIDOSHA KABUSHIKI KAISHA, Aichi (JP)

(72) Inventors: Yoichi Ogura, Shizuoka-ken (JP); Kunihiko Hayashi, Odawara (JP); Yuji Miyoshi, Susono (JP); Masatoshi Yano, Hadano (JP); Yu Ofune, Kariya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/283,825

(22) Filed: Feb. 25, 2019

(65) Prior Publication Data
US 2019/0291710 A1    Sep. 26, 2019

(30) Foreign Application Priority Data

Mar. 26, 2018   (JP) .............................. JP2018-058275

(51) Int. Cl.
*B60W 20/20* (2016.01)
*B60W 20/00* (2016.01)
(Continued)

(52) U.S. Cl.
CPC .............. *B60W 20/00* (2013.01); *B60K 6/24* (2013.01); *B60K 6/26* (2013.01); *B60K 6/28* (2013.01);
(Continued)

(58) Field of Classification Search
CPC .......... B60L 58/27; B60L 58/26; B60K 6/24; B60K 6/26; B60K 6/28; B60K 6/40;
(Continued)

(56) References Cited

U.S. PATENT DOCUMENTS

| 2010/0009246 A1* | 1/2010 | Maitre ................ H01M 10/617 |
| | | 429/62 |
| 2010/0012295 A1* | 1/2010 | Nemesh .................. B60L 58/26 |
| | | 165/104.19 |

(Continued)

FOREIGN PATENT DOCUMENTS

| FR | 2973742 A1 * 10/2012 ............. B60K 11/02 |
| JP | 2006296193 A * 10/2006 ......... B60H 1/00278 |

(Continued)

*Primary Examiner* — Mahmoud Gimie
*Assistant Examiner* — Joshua Campbell
(74) *Attorney, Agent, or Firm* — Hauptman Ham, LLP

(57) ABSTRACT

A temperature control apparatus of a vehicle according to the invention stops activating a heat pump and supplies heat exchanging liquid from an engine passage to a battery passage when a warming of the battery is requested and a temperature of the heat exchanging liquid flowing out of the engine passage is equal to or lower than a permitted upper limit temperature. On the other hand, the apparatus activates the heat pump to cool the heat exchanging liquid and supplies the cooled heat exchanging liquid from the engine passage to the battery passage when the warming of the battery is requested and the temperature of the heat exchanging liquid flowing out of the engine passage is higher than the permitted upper limit temperature.

19 Claims, 6 Drawing Sheets

(51) Int. Cl.
*B60K 6/40* (2007.10)
*B60L 58/26* (2019.01)
*B60L 58/27* (2019.01)
*B60K 6/28* (2007.10)
*B60K 6/26* (2007.10)
*B60K 6/24* (2007.10)
*F01P 3/20* (2006.01)
*B60K 11/02* (2006.01)

(52) U.S. Cl.
CPC ............... *B60K 6/40* (2013.01); *B60K 11/02* (2013.01); *B60L 58/26* (2019.02); *B60L 58/27* (2019.02); *F01P 3/20* (2013.01); *B60W 2710/0688* (2013.01); *B60W 2710/088* (2013.01); *B60W 2710/246* (2013.01); *B60Y 2200/92* (2013.01); *B60Y 2306/05* (2013.01); *F01P 2037/00* (2013.01); *F01P 2050/24* (2013.01)

(58) Field of Classification Search
CPC ......... B60K 11/02; F01P 3/20; F01P 2037/00; F01P 2050/24; B60H 1/00885; B60W 20/00; B60W 2710/0688; B60W 2710/088; B60W 2710/246; B60Y 2200/92; B60Y 2306/05
See application file for complete search history.

(56) References Cited

U.S. PATENT DOCUMENTS

| | | | |
|---|---|---|---|
| 2013/0111932 A1* | 5/2013 | Mishima | B60L 58/27 62/79 |
| 2013/0226380 A1 | 8/2013 | Ando et al. | |
| 2016/0031288 A1* | 2/2016 | Nishikawa | B60L 58/26 165/202 |
| 2016/0101666 A1 | 4/2016 | Sugimura et al. | |
| 2017/0008375 A1* | 1/2017 | Blatchley | H01M 10/625 |
| 2017/0028813 A1* | 2/2017 | Enomoto | B60H 1/24 |
| 2017/0174039 A1* | 6/2017 | Schedel | B60L 1/003 |

FOREIGN PATENT DOCUMENTS

| | | |
|---|---|---|
| JP | 2011173543 A | 9/2011 |
| JP | 2011240777 A | 12/2011 |
| JP | 2013-177026 A | 9/2013 |
| JP | 2014-234094 A | 12/2014 |

\* cited by examiner

TEMPERATURE CONTROL APPARATUS OF VEHICLE

RELATED APPLICATIONS

The present application claims priority to Japanese Patent Application No. 2018-058275 filed Mar. 26, 2018, the disclosure of which is hereby incorporated by reference herein in its entirety.

BACKGROUND

Field

The invention relates to a temperature control apparatus of a vehicle, in particular, a temperature control apparatus for controlling a temperature of an internal combustion engine of a vehicle.

Description of the Related Art

There is known a hybrid vehicle which is driven by an internal combustion engine and an electric motor. The hybrid vehicle includes a rechargeable battery for storing electric power to be supplied to the electric motor. The hybrid vehicle further includes a temperature control apparatus which includes a cooling water circulation circuit for flowing cooling water which cools the internal combustion engine and the battery in order to prevent a temperature of the internal combustion engine and a temperature of the battery from increasing excessively.

In general, a battery temperature (that is, the temperature of the battery) should be maintained at a temperature which is lower than an engine temperature (that is, the temperature of the internal combustion engine). In this regard, there is known a hybrid vehicle which includes a temperature control apparatus which includes a battery cooling water circulation circuit for flowing the cooling water which cools the battery and an engine cooling water circulation circuit for flowing the cooling water which cools the internal combustion engine.

When the battery temperature is excessively low, an efficiency of the battery supplying the electric power to the battery decreases. Thus, it is desired that the battery temperature is increased previously before a supply of the electric power from the battery to the electric motor is started, or the battery temperature is increased promptly when the battery temperature is excessively low at a time of starting the supply of the electric power from the battery to the electric motor.

JP 2014-234094 A discloses a vehicle heat management system which includes a first cooling water circulation circuit and a second cooling water circulation circuit. In the disclosed vehicle heat management system, a temperature of the cooling water flowing in the second cooling water circulation circuit, is higher than a temperature of the cooling water flowing in the first cooling water circulation circuit when the temperature of the cooling water flowing in the first cooling water circulation circuit, is lower than a certain temperature. Therefore, the temperature of the cooling water flowing in the first cooling water circulation circuit, can be increased by connecting the second cooling water circulation circuit to the first cooling water circulation circuit, thereby supplying the cooling water from the second cooling water circulation circuit to the first cooling water circulation circuit when the temperature of the cooling water flowing in the first cooling water circulation circuit is excessively low.

In this regard, the disclosed vehicle heat management system is configured to connect the second cooling water circulation circuit to the first cooling water circulation circuit, thereby preventing the temperature of the cooling water flowing in the first cooling water circulation circuit from decreasing excessively when the temperature of the cooling water flowing in the first cooing water circulation circuit is lower than a certain temperature.

As described above, JP 2014-234094 A suggests a technical concept of connecting one of two cooling water circulation circuit to the other cooling water circulation circuit to exchange heat between the cooling water flowing in one of the cooling water circulation circuits and the cooling water flowing in the other cooling water circulation circuit, thereby increasing the temperature of the cooling water flowing in one of the cooling water circulation circuits.

An application of the technical concept suggested in JP 2014-234094 A to the temperature control apparatus which includes the engine cooling water circulation circuit and the battery cooling water circulation circuit, may lead to a temperature control apparatus configured to increase the battery temperature previously before the supply of the electric power from the battery to the electric motor is started or increase the battery temperature promptly after the supply of the electric power from the battery to the electric motor is started by connecting the engine cooling water circulation circuit to the battery cooing water circulation circuit when a warming of the battery is requested.

In this regard, the battery is heated by heat generated by the battery when the electric power is supplied from the battery to the electric motor.

Therefore, the battery may be deteriorated thermally by the cooling water supplied from the engine cooling water circulation circuit to the battery cooling water circulation circuit before the temperature control apparatus determines that the battery is fully warmed and thus, disconnects the engine cooling water circulation circuit from the battery cooling water circulation circuit when the temperature control apparatus connects the engine cooling water circulation circuit to the battery cooling water circulation circuit while the temperature of the cooling water flowing in the engine cooling water circulation circuit is high for leading to a thermal deterioration of the battery.

SUMMARY

The invention has been made for solving the aforementioned problems. An object of the invention is to provide a temperature control apparatus of the vehicle capable of warming the battery while preventing the battery from being deteriorated thermally when the warming of the battery is requested.

A temperature control apparatus of a vehicle (100) according to the invention comprises an engine passage (11Pe), a battery passage (21Pbat), a first passage (11Pa, 31Pa, 23Pa, 21Pa), a second passage (21Pb, 23Pb, 31Pb, 11Pb), a heat pump (40), and an electronic control unit (90). The engine passage (11Pe) is formed in an internal combustion engine (110) of the vehicle (100). Heat exchanging liquid flows through the engine passage (11Pe). The battery passage (21Pbat) is formed in a battery (120) of the vehicle (100). The heat exchanging liquid flows through the battery passage (21Pbat). The first passage (11Pa, 31Pa, 23Pa, 21Pa)

is used for supplying to the battery passage (21Pbat) the heat exchanging liquid flowing out of the engine passage (11Pe). The second passage (21Pb, 23Pb, 31Pb, 11Pb) is used for returning to the engine passage (11Pe) the heat exchanging liquid flowing out of the battery passage (21Pbat). The heat pump (40) is provided so as to cool the heat exchanging liquid flowing through the first passage (11Pa, 31Pa, 23Pa, 21Pa). The electronic control unit (90) controls flow of the heat exchanging liquid and an activation of the heat pump (40).

The electronic control unit (90) is configured to stop activating the heat pump (40) and supply the heat exchanging liquid from the engine passage (11Pe) to the battery passage (21Pbat) through the first passage (11Pa, 31Pa, 23Pa, 21Pa) (see FIG. 4 and a process of a step 650 in FIG. 6) when a first condition is satisfied (see a determination "Yes" at a step 610 in FIG. 6 and a determination "Yes" at a step 640 in FIG. 6). The first condition includes at least a condition that a warming of the battery (120) is requested and a condition that a temperature (Tw_eng) of the heat exchanging liquid flowing out of the engine passage (11Pe) is equal to or lower than a permitted upper limit temperature (Tw_max).

The electronic control unit (90) is further configured to activate the heat pump (40) to cool the heat exchanging liquid flowing through the first passage (11Pa, 31Pa, 23Pa, 21Pa) and supply the heat exchanging liquid from the engine passage (11Pe) to the battery passage (21Pbat) through the first passage (11Pa, 31Pa, 23Pa, 21Pa) (see FIG. 5 and a process of a step 660 in FIG. 6) when a second condition is satisfied (see the determination "Yes" at the step 610 in FIG. 6 and a determination "No" at the step 640 in FIG. 6). The second condition includes at least the condition that the warming of the battery (120) is requested and a condition that the temperature (Tw_eng) of the heat exchanging liquid flowing out of the engine passage (11Pe) is higher than the permitted upper limit temperature (Tw_max).

In general, the temperature of the battery can be increased at a large increase rate by supplying the heat exchanging liquid from the engine passage to the battery passage. However, when the temperature of the heat exchanging liquid supplied to the battery passage is excessively high, the battery may deteriorate thermally.

According to the invention, the heat exchanging liquid which flows out of the engine passage and is not cooled, is supplied to the battery passage when the temperature of the heat exchanging liquid flowing out of the engine passage is equal to or lower than the permitted upper limit temperature. On the other hand, the heat exchanging liquid which flows out of the engine passage and is cooled, is supplied to the battery passage when the temperature of the heat exchanging liquid flowing out of the engine passage is higher than the permitted upper limit temperature. Thus, the battery can be prevented from deteriorating thermally, and the temperature of the battery can be increased at the large increase rate.

According to an aspect of the invention, the temperature control apparatus may further comprise a heater core passage (12Ph), a condenser passage (12Pc), a fifth passage (12Pb, 13Pb, 11Pb, 11Pe, 11Pa, 13Pa, 12Pa), and a sixth passage (12Pb, 13Pb, 11Pb, 11Pe, 11Pa, 13Pa, 12Pa). The heater core passage (12Ph) is formed in a heating heater core (12H) of the vehicle (100). The heat exchanging liquid flows through the heater core passage (12Ph). The condenser passage (12Pc) is formed in a condenser (41C) of the heat pump (40). The heat exchanging liquid flows through the condenser passage (12Pc). The fifth passage (12Pb, 13Pb, 11Pb, 11Pe, 11Pa, 13Pa, 12Pa) is used for supplying to the heater core passage (12Ph) the heat exchanging liquid flowing out of the condenser passage (12Pc). The sixth passage (12Pb, 13Pb, 11Pb, 11Pe, 11Pa, 13Pa, 12Pa) is used for returning to the condenser passage (12Pc) the heat exchanging liquid flowing out of the heater core passage (12Ph).

In this aspect, the second condition may further include a condition that a heating of the heating heater core (12H) is requested.

Further, in this aspect, the electronic control unit (90) may be configured to supply the heat exchanging liquid from the condenser passage (12Pc) to the heater core passage (12Ph) through the fifth passage (12Pb, 13Pb, 11Pb, 11Pe, 11Pa, 13Pa, 12Pa) (see FIG. 5 and the process of the step 660 in FIG. 6) when the second condition is satisfied (see the determination "Yes" at the step 610 in FIG. 6 and the determination "Yes" at the step 640 in FIG. 6).

When the heat pump is activated to cool the heat exchanging liquid flowing through the first passage, a heat exchanging is performed between the heat medium of the heat pump and the heat exchanging liquid flowing through the first passage, thereby supplying the heat of the heat exchanging liquid flowing through the first passage to the heat medium of the heat pump. Therefore, if the heat supplied to the heat medium is not used for heating, the heat supplied from the heat exchanging liquid flowing through the first passage wastes.

According to this aspect of the invention, when the second condition is satisfied, in particular, the warming of the battery is requested, the temperature of the heat exchanging liquid flowing out of the engine passage is higher than the permitted upper limit temperature, and the heating of the heating heater core is requested, the heat exchanging liquid cooled by the heat pump is supplied from the engine passage to the heater core passage through the first passage, and the heat exchanging liquid is supplied from the condenser passage to the heater core passage through the fifth passage. Thereby, the heat of the heat exchanging liquid heated at the condenser of the heat pump, is used for heating the heating heater core. Therefore, the heat supplied by the heat exchanging liquid flowing through the first passage, can be prevented from wasting.

According to another aspect of the invention, the first condition may further include a condition that the temperature (Tw_eng) of the heat exchanging liquid flowing out of the engine passage (11Pe) is equal to or higher than a minimally-requested temperature (Tw_min) which is lower than the permitted upper limit temperature (Tw_max) (see the process of the step 610 in FIG. 6).

According to further another aspect of the invention, the second condition may further include a condition that the temperature (Tw_eng) of the heat exchanging liquid flowing out of the engine passage (11Pe) is equal to or higher than a minimally-requested temperature (Tw_min) which is lower than the permitted upper limit temperature (Tw_max) (see the process of the step 610 in FIG. 6).

According to further another aspect of the invention, the electronic control unit (90) may be configured to stop supplying the heat exchanging liquid from the engine passage (11Pe) to the battery passage (21Pbat) through the first passage (11Pa, 31Pa, 23Pa, 21Pa) when a third condition is satisfied (see the determination "No" at the step 610 in FIG. 6). The third condition includes at least a condition that the temperature (Tw_eng) of the heat exchanging liquid flowing out of the engine passage (11Pe) is lower than a minimally-requested temperature (Tw_min) which is lower than the permitted upper limit temperature (Tw_max).

When the temperature of the heat exchanging liquid flowing out of the engine passage, is too low, the temperature of the battery cannot be increased even by supplying the heat exchanging liquid from the engine passage to the battery passage. Instead, the temperature of the battery may be decreased.

According to this aspect of the invention, a supply of the heat exchanging liquid from the engine passage to the battery passage through the first passage is stopped when the temperature of the heat exchanging liquid flowing out of the engine passage is lower than the minimally-requested temperature. Therefore, the heat exchanging liquid is not supplied from the engine passage to the battery passage when the temperature of the heat exchanging liquid flowing out of the engine passage is low. Thus, the temperature of the battery can be prevented from decreasing.

According to further another aspect of the invention, the first condition may further include a condition that a temperature (Tw_bat) of the heat exchanging liquid flowing out of the battery passage (21Pbat) is equal to or higher than a predetermined switching temperature (Tw_sw) (see the determination "No" at the step 620 in FIG. 6).

According to further another aspect of the invention, the second condition may further include a condition that a temperature (Tw_bat) of the heat exchanging liquid flowing out of the battery passage (21Pbat) is equal to or higher than a predetermined switching temperature (Tw_sw) (see the determination "No" at the step 620 in FIG. 6).

According to further another aspect of the invention, the electronic control unit (90) may be configured to stop supplying the heat exchanging liquid from the engine passage (11Pe) to the battery passage (21Pbat) through the first passage (11Pa, 31Pa, 23Pa, 21Pa) (see FIG. 3 and the process of the step 630 in FIG. 6) when a fourth condition is satisfied (see the determination "Yes" at the step 620 in FIG. 6). The fourth condition includes at least the condition that the warming of the battery (120) is requested, the condition that the heating of the heating heater core (12H) is requested, and a condition that a temperature (Tw_bat) of the heat exchanging liquid flowing out of the battery passage (21Pbat) is lower than a predetermined switching temperature (Tw_sw).

When the heat exchanging liquid is supplied from the engine passage to the battery passage, an amount of the heat exchanging liquid supplied from the engine passage to the heater core passage, decreases. Therefore, a time required for the temperature of the heating heater core to increase to a desired temperature, increases. In this regard, the battery generates heat and thus, the temperature of the battery is increased by the heat generated by the battery while the temperature of the battery is low.

According to this aspect of the invention, the supply of the heat exchanging liquid from the engine passage to the battery passage is stopped when the warming of the battery is requested, the heating of the heating heater core is requested, and the temperature of the heat exchanging liquid flowing out of the battery passage is lower than the predetermined switching temperature. Therefore, all the heat exchanging liquid flowing out of the engine passage is supplied to the heater core passage while the temperature of the heat exchanging liquid flowing out of the battery passage is lower than the predetermined switching temperature, that is, while the temperature of the battery is low. Thus, the time required for the temperature of the heating heater core to increase to the desired temperature can be decreased.

In addition, according to this aspect of the invention, the heat exchanging liquid is supplied from the engine passage to the battery passage only after the temperature of the heat exchanging liquid flowing out of the battery passage becomes equal to or higher than the predetermined switching temperature. At this time, the temperature of the battery has increased to a certain high temperature by the heat generated by the battery. Thus, the time required for the temperature of the battery to increase to the desired temperature can be prevented from increasing excessively.

According to further another aspect of the invention, the temperature control apparatus may further comprise a device passage (22Pd), a third passage (22Pa, 23Pa, 21Pa), and a fourth passage (21Pb, 23Pb, 22Pb). The device passage (22Pd) is formed in a device (180) including a motor (111, 112) of the vehicle (100). The heat exchanging liquid flows through the device passage (22Pd). The third passage (22Pa, 23Pa, 21Pa) is used for supplying to the battery passage (21Pbat) the heat exchanging liquid flowing out of the device passage (22Pd). The fourth passage (21Pb, 23Pb, 22Pb) is used for returning to the device passage (22Pd) the heat exchanging liquid flowing out of the battery passage (21Pbat).

According to this aspect, the electronic control unit (90) may be configured to supply the heat exchanging liquid from the device passage (22Pd) to the battery passage (21Pbat) through the third passage (22Pa, 23Pa, 21Pa) (see FIG. 3 and the process of the step 630 in FIG. 6) when the fourth condition is satisfied (see the determination "Yes" at the step 620 in FIG. 6).

According to this aspect of the invention, the supply of the heat exchanging liquid from the engine passage to the battery passage is stopped when the warming of the battery is requested, the heating of the heating heater core is requested, and the temperature of the heat exchanging liquid flowing out of the battery passage is lower than the predetermined switching temperature. Therefore, the increase rate of the temperature of the battery decreases. At this time, according to this aspect of the invention, the heat exchanging liquid is supplied from the device passage to the battery passage. Thus, the increase rate of the temperature of the battery can be prevented from decreasing excessively.

According to further another aspect of the invention, the electronic control unit (90) may be configured to stop supplying the heat exchanging liquid from the engine passage (11Pe) to the battery passage (21Pbat) through the first passage (11Pa, 31Pa, 23Pa, 21Pa) when a fifth condition is satisfied (see the determination "No" at the step 610 in FIG. 6). The fifth condition includes at least a condition that the warming of the battery (120) is not requested.

According to further another aspect of the invention, the temperature control apparatus may further comprise a seventh passage (11Pa, 13Pa, 12Pa) and an eighth passage (12Pb, 13Pb, 11Pb). The seventh passage (11Pa, 13Pa, 12Pa) is used for supplying to the heater core passage (12Ph) the heat exchanging liquid flowing out of the engine passage (11Pe). The eighth passage (12Pb, 13Pb, 11Pb) is used for returning to the engine passage (11Pe) the heat exchanging liquid flowing out of the heater core passage (12Ph).

In this aspect, the electronic control unit (90) may be configured to supply the heat exchanging liquid from the engine passage (11Pe) to the heater core passage (12Ph) through the seventh passage (11Pa, 13Pa, 12Pa) (see FIGS. 3 to 5 and the processes of the steps 630, 650, and 660 in FIG. 6) when a condition that the heating of the heating heater core (12H) is requested, is satisfied (see the determination "Yes" at the step 610 in FIG. 6).

In the above description, for facilitating understanding of the present invention, elements of the present invention corresponding to elements of an embodiment described later are denoted by reference symbols used in the description of the embodiment accompanied with parentheses. However, the elements of the present invention are not limited to the elements of the embodiment defined by the reference symbols. The other objects, features and accompanied advantages of the present invention can be easily understood from the description of the embodiment of the present invention along with the drawings.

DESCRIPTION OF THE PREFERRED EMBODIMENTS

Figure 1:
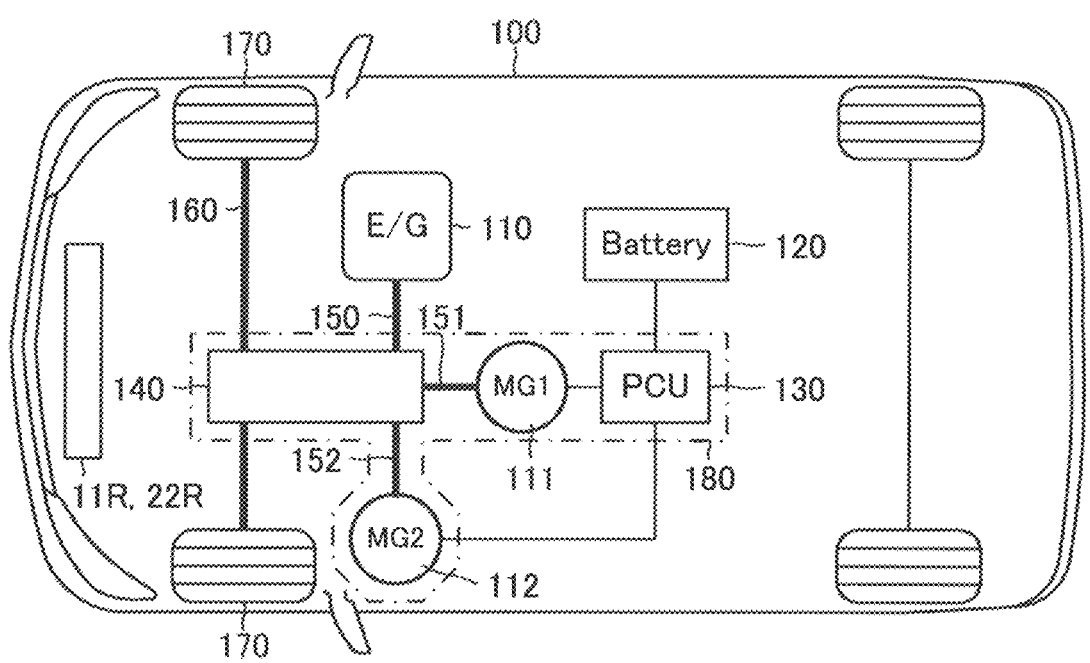
FIG. 1 is a view for showing a vehicle, to which a temperature control apparatus according to an embodiment of the invention is applied.

Below, a temperature control apparatus of a vehicle according to an embodiment of the invention will be described with reference to the drawings. The temperature control apparatus according to the embodiment is applied to a vehicle 100 shown in FIG. 1. An internal combustion engine 110, a rechargeable battery 120, and a hybrid device 180 are mounted on the vehicle 100. Hereinafter, the temperature control apparatus according to the embodiment will be referred to as "the embodiment apparatus".

The hybrid device 180 includes a first motor generator 111, a second motor generator 112, a power control unit 130, a power distribution mechanism 140, etc. The power control unit 130 includes an inverter 131 (see FIG. 2), a boost converter, a DC/DC converter, etc. Hereinafter, the power control unit 130 will be referred to as "the PCU 130".

The vehicle 100 is a so-called hybrid vehicle which is driven by power output from the engine 110, the first motor generator 111, and the second motor generator 112. The vehicle 100, to which the embodiment apparatus is applied, may be a so-called plug-in hybrid vehicle in which the battery 120 can be charged by an outside electric power source.

The power distribution mechanism 140 is, for example, a planetary gear mechanism. The power distribution mechanism 140 distributes a torque input to the power distribution mechanism 140 from the engine 110 via an output shaft 150 into a torque for rotating an output shaft of the power distribution mechanism 140 and a torque for driving the first motor generator 111 as an electric generator at a predetermined distribution proportion (with a predetermined distribution property).

The power distribution mechanism 140 transmits the torque input to the power distribution mechanism 140 from the engine 110 via the output shaft 150 and a torque input to the power distribution mechanism 140 from the second motor generator 112 to right and left driving wheels 170 via a wheel drive shaft 160. The power distribution mechanism 140 is known, for example in JP 2013-77026 A, etc.

The first and second motor generators 111 and 112 are permanent magnet synchronous motors, respectively. The first and second motor generators 111 and 112 are electrically connected to the battery 120 via the inverter 131 of the PCU 130.

The first motor generator 111 is operatively connected to the power distribution mechanism 140 via an input/output shaft 151. The first motor generator 111 is mainly used as an electric generator. When the first motor generator 111 is used as the electric generator, a rotation shaft of the first motor generator 111 is rotated by external forces such as a moving energy of the vehicle 100 and the torque output from the engine 110, thereby generating electric power. The generated electric power is charged in the battery 120 via the inverter 131 of the PCU 130. The first motor generator 111 is also used as an electric motor. When the first motor generator 111 is used as the electric motor, the first motor generator 111 is driven by the electric power supplied thereto from the battery 120 via the inverter 131 of the PCU 130.

The second motor generator 112 is operatively connected to the power distribution mechanism 140 via an input/output shaft 152. The second motor generator 112 is mainly used as an electric motor. When the second motor generator 112 is used as the electric motor, the second motor generator 112 is activated by the electric power supplied thereto from the battery 120 via the inverter 131 of the PCU 130. The second motor generator 112 is also used as an electric generator. When the second motor generator 112 is used as the electric generator, a rotation shaft of the second motor generator 112 is rotated by the external forces such as the moving energy of the vehicle 100 and the torque output from the engine 110, thereby generating the electric power. The generated electric power is charged in the battery 120 via the inverter 131 of the PCU 130.

Figure 2:
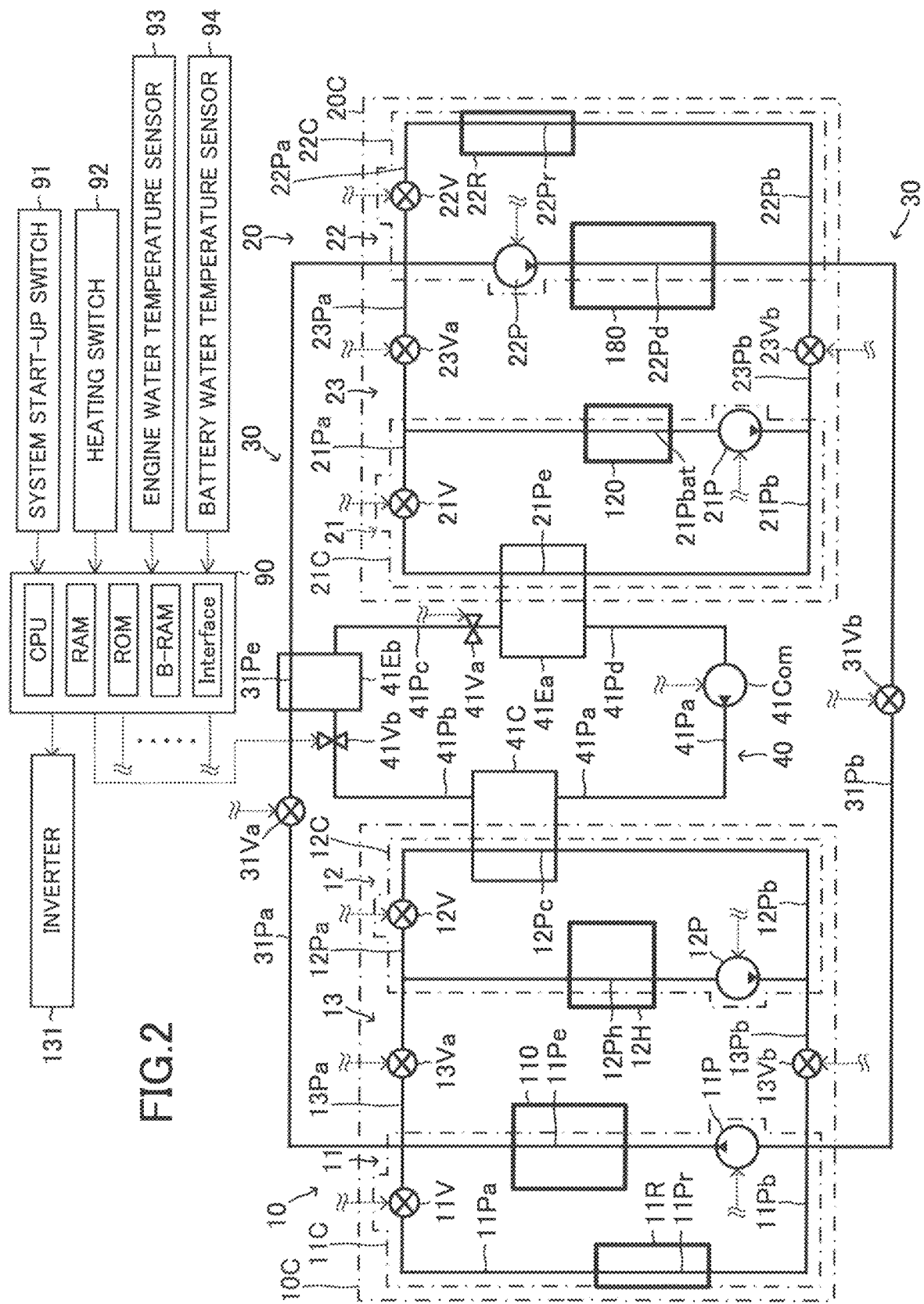
FIG. 2 is a view for showing the temperature control apparatus according to the embodiment.

As shown in FIG. 2, the inverter 131 is electrically connected to an ECU 90. The ECU 90 is an electronic control unit or an electronic control circuit including as a main component a microcomputer including a CPU, a ROM, a RAM, an interface, etc. The CPU realizes various functions described later by executing instructions or routines stored in a memory, i.e., the ROM.

An activation of the inverter 131 is controlled by the ECU 90. The ECU 90 controls activations of the first motor generator 111 and the second motor generator 112 by controlling the activation of the inverter 131.

<Temperature Control Apparatus>

The embodiment apparatus includes an engine system temperature control apparatus 10, a hybrid system temperature control apparatus 20, and a circuit connection apparatus 30. The engine system temperature control apparatus 10 includes an engine temperature control apparatus, a heating apparatus 12, and an engine system connection apparatus 13. The hybrid system temperature control apparatus 20 includes a battery temperature control apparatus 21, a device temperature control apparatus 22, and a hybrid system connection apparatus 23.

<Engine System Temperature Control Apparatus>
<Engine Temperature Control Apparatus>

The engine temperature control apparatus 11 includes an engine water circulation circuit 11C as an engine system water circulation circuit 10C, an engine radiator 11R, an engine pump 11P, and an engine shut-off valve 11V.

When the engine 110 operates, the engine 110 generates heat. The engine 110 operates optimally when a temperature Teng of the engine 110 is maintained at a temperature which is within a predetermined engine temperature range Weng which is higher than zero degree Celsius. The engine water circulation circuit 11C is a circuit, through which cooling water or cooling liquid flows for controlling the temperature Teng of the engine 110 to the temperature which is within the predetermined engine temperature range Weng. Hereinafter, the temperature Teng of the engine 110 will be referred to as "the engine temperature Teng".

Below, the embodiment apparatus will be described, using the cooling water as liquid which flows in the engine water circulation circuit 11C and circulation circuits described later. The liquid which flows in the engine water circulation circuit 11C and the circulation circuits described later may be liquid capable of exchanging the heat, that is, heat exchanging liquid.

The engine water circulation circuit 11C is formed of an engine passage 11Pe, an engine radiator passage 11Pr, a first engine water circulation passage 11Pa, and a second engine water circulation passage 11Pb. The engine passage 11Pe is a cooling water passage formed in the engine 110. The engine radiator passage 11Pr is a cooling water passage formed in the engine radiator 11R. The first engine water circulation passage 11Pa is a cooling water passage which connects an outlet of the engine passage 11Pe to an inlet of the engine radiator passage 11Pr. The second engine water circulation passage 11Pb is a cooling water passage which connects an outlet of the engine radiator passage 11Pr to an inlet of the engine passage 11Pe.

The engine shut-off valve 11V is provided in the first engine water circulation passage 11Pa between the engine radiator passage 11Pr and a portion of the first engine water circulation passage 11Pa, at which a first circuit connection passage 31Pa described later in detail and a first engine system connection passage 13Pa are connected to the first engine water circulation passage 11Pa. The engine shut-off valve 11V is electrically connected to the ECU 90. A set position of the engine shut-off valve 11V is controlled by the ECU 90.

When the engine shut-off valve 11V is set at an open position, a portion of the first engine water circulation passage 11Pa between the engine radiator passage 11Pr and the portion of the first engine water circulation passage 11Pa, at which the first engine system connection passage 13Pa described later in detail is connected to the first engine water circulation passage 11Pa, is open. Thus, the cooling water can flow through the portion of the first engine water circulation passage 11Pa between the engine radiator passage 11Pr and the portion of the first engine water circulation passage 11Pa, at which the first engine system connection passage 13Pa described later in detail is connected to the first engine water circulation passage 11Pa. On the other hand, when the engine shut-off valve 11V is set at a closed position, the portion of the first engine water circulation passage 11Pa between the engine radiator passage 11Pr and the portion of the first engine water circulation passage 11Pa, at which the first engine system connection passage 13Pa described later in detail is connected to the first engine water circulation passage 11Pa, is shut off. Thus, the cooling water cannot flow through the portion of the first engine water circulation passage 11Pa between the engine radiator passage 11Pr and the portion of the first engine water circulation passage 11Pa, at which the first engine system connection passage 13Pa described later in detail is connected to the first engine water circulation passage 11Pa.

The engine pump 11P is provided in the second engine water circulation passage 11Pb between the engine 110 and a portion of the second engine water circulation passage 11Pb, at which a second circuit connection passage 31Pb described later in detail and a second engine system connection passage 13Pb are connected to the second engine water circulation passage 11Pb. The engine pump 11P is electrically connected to the ECU 90. An activation of the engine pump 11P is controlled by the ECU 90.

<Heating Apparatus>

The heating apparatus 12 includes a heating water circulation circuit 12C as the engine system water circulation circuit 10C, a heater core 12H, a heating pump 12P, and a heating shut-off valve 12V.

When a driver of the vehicle 100 requests to heat an interior of the vehicle 100, a fan (not shown) is activated to supply air to the heater core 12H, thereby supplying the heat of the cooling water flowing through a heater core passage 12Ph to the interior of the vehicle 100. Thereby, the interior of the vehicle 100 is heated. The heating water circulation circuit 12C is a circuit for causing the cooling water having the heat sufficient for heating the interior of the vehicle 100 to flow through the heater core passage 12Ph.

The heating apparatus 12 is formed of the heater core passage 12Ph, a condenser passage 12Pc, a first heating water circulation passage 12Pa, and a second heating water circulation passage 12Pb. The heater core passage 12Ph is a cooling water passage formed in the heater core 12H. The condenser passage 12Pc is a cooling water passage formed in a condenser 41C of a heat pump 40 described later in detail. The first heating water circulation passage 12Pa is a cooling water passage which connects an outlet of the condenser passage 12Pc to an inlet of the heater core passage 12Ph. The second heating water circulation passage 12Pb is a cooling water passage which connects an outlet of the heater core passage 12Ph to an inlet of the condenser passage 12Pc.

The heating shut-off valve 12V is provided in the first heating water circulation passage 12Pa between the condenser passage 12Pc and a portion of the first heating water circulation passage 12Pa, at which the first engine system connection passage 13Pa described later in detail is connected to the first heating water circulation passage 12Pa. The heating shut-off valve 12V is electrically connected to the ECU 90. A set position of the heating shut-off valve 12V is controlled by the ECU 90.

When the heating shut-off valve 12V is set at an open position, a portion of the first heating water circulation passage 12Pa between the condenser passage 12Pc and a portion of the first heating water circulation passage 12Pa, at which the first engine system connection passage 13Pa described later in detail is connected to the first heating water circulation passage 12Pa, is open. Thus, the cooling water can flow through the portion of the first heating water circulation passage 12Pa between the condenser passage 12Pc and the portion of the first heating water circulation passage 12Pa, at which the first engine system connection passage 13Pa described later in detail is connected to the first heating water circulation passage 12Pa. On the other hand, when the heating shut-off valve 12V is set at a closed position, the portion of the first heating water circulation passage 12Pa between the condenser passage 12Pc and the portion of the first heating water circulation passage 12Pa, at which the first engine system connection passage 13Pa described later in detail is connected to the first heating water circulation passage 12Pa, is shut off. Thus, the cooling water cannot flow through the portion of the first heating water circulation passage 12Pa between the condenser passage 12Pc and the portion of the first heating water circulation passage 12Pa, at which the first engine system connection passage 13Pa described later in detail is connected to the first heating water circulation passage 12Pa.

The heating pump 12P is provided in the second heating water circulation passage 12Pb between the heater core 12H and a portion of the second heating water circulation passage 12Pb, at which a second engine system connection passage 13Pb described later in detail is connected to the second heating water circulation passage 12Pb. The heating pump 12P is electrically connected to the ECU 90. An activation of the heating pump 12P is controlled by the ECU 90.

<Engine System Connection Apparatus>

The engine system connection apparatus 13 includes the first engine system connection passage 13Pa, the second engine system connection passage 13Pb, a first engine system shut-off valve 13Va, and a second engine system shut-off valve 13Vb.

The first engine system connection passage 13Pa is a cooling water passage which connects the engine water circulation circuit 11C to the heating water circulation circuit 12C. An end of the first engine system connection passage 13Pa is connected to the portion of the first engine water circulation passage 11Pa, at which the first circuit connection passage 31Pa is connected to the first engine water circulation passage 11Pa. The other end of the first engine system connection passage 13Pa is connected to the first heating water circulation passage 12Pa between the heating shut-off valve 12V and the condenser 41C.

The first engine system shut-off valve 13Va is provided in the first engine system connection passage 13Pa. The first engine system shut-off valve 13Va is electrically connected to the ECU 90. A set position of the first engine system shut-off valve 13Va is controlled by the ECU 90.

When the first engine system shut-off valve 13Va is set at an open position, the first engine system connection passage 13Pa is open. Thus, the cooling water can flow into the first heating water circulation passage 12Pa from the first engine water circulation passage 11Pa through the first engine system connection passage 13Pa. On the other hand, when the first engine system shut-off valve 13Va is set at a closed position, the first engine system connection passage 13Pa is shut-off. Thus, the cooling water cannot flow into the first heating water circulation passage 12Pa from the first engine water circulation passage 11Pa through the first engine system connection passage 13Pa.

The second engine system connection passage 13Pb is a cooling water passage which connects the heating water circulation circuit 12C to the engine water circulation circuit 11C. An end of the second engine system connection passage 13Pb is connected to the second heating water circulation passage 12Pb between the heating pump 12P and the condenser 41C. The other end of the second engine system connection passage 13Pb is connected to the portion of the second engine water circulation passage 11Pb, at which the second circuit connection passage 31Pb is connected to the second engine water circulation passage 11Pb.

The second engine system shut-off valve 13Vb is provided in the second engine system connection passage 13Pb. The second engine system shut-off valve 13Vb is electrically connected to the ECU 90. A set position of the second engine system shut-off valve 13Vb is controlled by the ECU 90.

When the second engine system shut-off valve 13Vb is set at an open position, the second engine system connection passage 13Pb is open. Thus, the cooling water can flow into the second engine water circulation passage 11Pb from the second heating water circulation passage 12Pb through the second engine system connection passage 13Pb. On the other hand, when the second engine system shut-off valve 13Vb is set at a closed position, the second engine system connection passage 13Pb is shut-off. Thus, the cooling water cannot flow into the second engine water circulation passage 11Pb from the second heating water circulation passage 12Pb through the second engine system connection passage 13Pb.

<Hybrid System Temperature Control Apparatus>

<Battery Temperature Control Apparatus>

The battery temperature control apparatus 21 includes a battery water circulation circuit 21C as a hybrid system water circulation circuit 20C, the heat pump 40, a battery pump 21P, and a battery shut-off valve 21V.

When the electric power is supplied to the first motor generator 111 or the second motor generator 112 from the battery 120, the battery 120 generates the heat. The battery 120 operates optimally when a temperature Tbat of the battery 120 is maintained within a predetermined battery temperature range Wbat which is higher than zero degree Celsius. The battery water circulation circuit 21C is a circuit, through which the cooling water flows for controlling the temperature Tbat of the battery 120 to the temperature which is within the predetermined battery temperature range Wbat. Hereinafter, the temperature Tbat of the battery 120 will be referred to as "the battery temperature Tbat".

The battery water circulation circuit 21C is formed of a battery passage 21Pbat, an evaporator passage 21Pe, a first battery water circulation passage 21Pa, and a second battery water circulation passage 21Pb. The battery passage 21Pbat is a cooling water passage formed in the battery 120. The evaporator passage 21Pe is a cooling water passage formed in a first evaporator 41Ea of the heat pump 40. The first battery water circulation passage 21Pa is a cooling water passage which connects an outlet of the evaporator passage 21Pe to an inlet of the battery passage 21Pbat. The second battery water circulation passage 21Pb is a cooling water passage which connects an outlet of the battery passage 21Pbat to an inlet of the evaporator passage 21Pe.

The battery shut-off valve 21V is provided in the first battery water circulation passage 21Pa between the first evaporator 41Ea and a portion of the first battery water circulation passage 21Pa, at which a first hybrid system connection passage 23Pa described later in detail is connected to the first battery water circulation passage 21Pa. The battery shut-off valve 21V is electrically connected to the ECU 90. A set position of the battery shut-off valve 21V is controlled by the ECU 90.

When the battery shut-off valve 21V is set at an open position, a portion of the first battery water circulation passage 21Pa between the first evaporator 41Ea and the portion of the first battery water circulation passage 21Pa, at which the first hybrid system connection passage 23Pa described later in detail is connected to the first battery water circulation passage 21Pa, is open. Thus, the cooling water can flow through the portion of the first battery water circulation passage 21Pa between the first evaporator 41Ea and the portion of the first battery water circulation passage 21Pa, at which the first hybrid system connection passage 23Pa described later in detail is connected to the first battery water circulation passage 21Pa. On the other hand, when the battery shut-off valve 21V is set at a closed position, the portion of the first battery water circulation passage 21Pa between the first evaporator 41Ea and the portion of the first battery water circulation passage 21Pa, at which the first hybrid system connection passage 23Pa described later in detail is connected to the first battery water circulation passage 21Pa, is shut off. Thus, the cooling water cannot flow through the portion of the first battery water circulation passage 21Pa between the first evaporator 41Ea and the portion of the first battery water circulation passage 21Pa, at which the first hybrid system connection passage 23Pa described later in detail is connected to the first battery water circulation passage 21Pa.

The battery pump 21P is provided in the second battery water circulation passage 21Pb between the battery 120 and a portion of the second battery water circulation passage 21Pb, at which a second hybrid system connection passage 23Pb described later in detail is connected to the second battery water circulation passage 21Pb. The battery pump 21P is electrically connected to the ECU 90. An activation of the battery pump 21P is controlled by the ECU 90.

<Heat Pump>

The heat pump 40 includes the first evaporator 41Ea, a second evaporator 41Eb, the condenser 41C, a compressor 41Com, a first expansion valve 41Va, and a second expansion valve 41Vb. The heat pump 40 further includes a first heat pump passage 41Pa, a second heat pump passage 41Pb, a third heat pump passage 41Pc, and a fourth heat pump passage 41Pd.

The first heat pump passage 41Pa is a heat medium passage which connects a heat medium discharge outlet of the compressor 41Com to a heat medium inlet of the condenser 41C. The second heat pump passage 41Pb is a heat medium passage which connects a heat medium outlet of the second evaporator 41Eb to a heat medium inlet of the first evaporator 41Ea. The third heat pump passage 41Pc is a heat medium passage which connects a heat medium outlet of the second evaporator 41Eb to a heat medium inlet of the first evaporator 41Ea. The fourth heat pump passage 41Pd is a heat medium passage which connects a heat medium outlet of the first evaporator 41Ea to a heat medium flow-in inlet of the compressor 41Com.

The first expansion valve 41Va is provided in the third heat pump passage 41Pc. The second expansion valve 41Vb is provided in the second heat pump passage 41Pb.

The compressor 41Com, the first expansion valve 41Va, and the second expansion valve 41Vb are electrically connected to the ECU 90. Activations of the compressor 41Com, the first expansion valve 41Va, and the second expansion valve 41Vb are controlled by the ECU 90.

When the compressor 41Com is activated, heat medium is discharged from the compressor 41Com to the first heat pump passage 41Pa. The heat medium having a temperature increased by the activated compressor 41Com, flows through the first heat pump passage 41Pa and flows into the condenser 41C. The heat medium flows into the second heat pump passage 41Pb after the heat medium flows through the condenser 41C.

The heat medium discharges the heat therefrom, thereby condensing while the heat medium flows through the condenser 41C. The heat of the heat medium is discharged to the cooling water flowing through the condenser passage 12Pc of the heating water circulation circuit 12C in the condenser 41C. Thereby, the cooling water flowing through the condenser passage 12Pc is heated.

The heat medium flowing into the second heat pump passage 41Pb, flows through the second heat pump passage 41Pb and flows into the second evaporator 41Eb. In this example, the second expansion valve 41Vb is activated at a non-decompression mode. The heat medium flows through the second evaporator 41Eb and then, flows into the third heat pump passage 41Pc. The heat medium flows through the third heat pump passage 41Pc and then, flows into the first evaporator 41Ea. In this example, the first expansion valve 41Va is activated at a decompression mode. Therefore, the heat medium is decompressed when the heat medium passes through the first expansion valve 41Va. The heat medium removes the heat from the cooling water flowing through the evaporator passage 21Pe of the battery water circulation circuit 21C, thereby evaporating while the heat medium flows through the first evaporator 41Ea. Thereby, the cooling water flowing through the evaporator passage 21Pe, is cooled.

The heat medium flows through the first evaporator 41Ea and then, flows into the fourth heat pump passage 41Pd. The heat medium flows through the fourth heat pump passage 41Pd and then, flows into the compressor 41Com.

On the other hand, when the first expansion valve 41Va is activated at the non-decompression mode, and the second expansion valve 41Vb is activated at the compression mode while the compressor 41Com is activated, the heat medium is decompressed while the heat medium passes through the second expansion valve 41Vb. Then, the heat medium removes the heat from the cooling water flowing through an evaporator passage 31Pe described later in detail of the first circuit connection passage 31Pa, thereby evaporating while the heat medium flows through the second evaporator 41Eb. Thereby, the cooling water flowing through the evaporator passage 31Pe is cooled.

<Device Temperature Control Apparatus>

The device temperature control apparatus 22 includes a device water circulation circuit 22C as the hybrid system water circulation circuit 20C, a device radiator 22R, a device pump 22P, and a device shut-off valve 22V.

When the hybrid device 180 operates, the hybrid device 180 generates the heat. The hybrid device 180 operates optimally when a temperature Tdev of the hybrid device 180 is maintained at a temperature which is within a predetermined device temperature range Wdev which is higher than zero Celsius. The device water circulation circuit 22C is a circuit, through which the cooling water flows for controlling the temperature Tdev of the hybrid device 180 to the temperature which is within the predetermined device temperature range Wdev. Hereinafter, the temperature Tdev of the hybrid device 180 will be referred to as "the device temperature Tdev".

The device water circulation circuit 22C is formed of a device passage 22Pd, a device radiator passage 22Pr, a first device water circulation passage 22Pa, and a second device water circulation passage 22Pb. The device passage 22Pd is a cooling water passage formed in the hybrid device 180. The device radiator passage 22Pr is a cooling water passage formed in the device radiator 22R. The first device water circulation passage 22Pa is a cooling water passage which connects an outlet of the device radiator passage 22Pr to an inlet of the device passage 22Pd. The second device water circulation passage 22Pb is a cooling water passage which connects an outlet of the device passage 22Pd to an inlet of the device radiator passage 22Pr.

The device shut-off valve 22V is provided in the first device water circulation passage 22Pa between the device radiator 22R and a portion of the first device water circulation passage 22Pa, at which the first circuit connection passage 31Pa described later in detail and the second hybrid system connection passage 23Pb are connected to the first device water circulation passage 22Pa. The device shut-off valve 22V is electrically connected to the ECU 90. A set position of the device shut-off valve 22V is controlled by the ECU 90.

When the device shut-off valve 22V is set at an open position, a portion of the first device water circulation passage 22Pa between the device radiator passage 22Pr and the portion of the first device water circulation passage 22Pa, at which the first hybrid system connection passage 23Pa described later in detail is connected to the first device water circulation passage 22Pa, is open. Thus, the cooling water can flow through the portion of the first device water circulation passage 22Pa between the device radiator passage 22Pr and the portion of the first device water circulation passage 22Pa, at which the first hybrid system connection passage 23Pa described later in detail is connected to the first device water circulation passage 22Pa. On the other hand, when the device shut-off valve 22V is set at a closed position, the portion of the first device water circulation passage 22Pa between the device radiator passage 22Pr and the portion of the first device water circulation passage 22Pa, at which the first hybrid system connection passage 23Pa described later in detail is connected to the first device water circulation passage 22Pa, is shut off. Thus, the cooling water cannot flow through the portion of the first device water circulation passage 22Pa between the device radiator passage 22Pr and the portion of the first device water circulation passage 22Pa, at which the first hybrid system connection passage 23Pa described later in detail is connected to the first device water circulation passage 22Pa.

The device pump 22P is provided in the first device water circulation passage 22Pa between the hybrid device 180 and the portion of the first device water circulation passage 22Pa, at which the first circuit connection passage 31Pa described later in detail and the second hybrid system connection passage 23Pb are connected to the first device water circulation passage 22Pa. The device pump 22P is electrically connected to the ECU 90. An activation of the device pump 22P is controlled by the ECU 90.

<Hybrid System Connection Apparatus>

The hybrid system connection apparatus 23 includes the first hybrid system connection passage 23Pa, the second hybrid system connection passage 23Pb, a first hybrid system shut-off valve 23Va, and a second hybrid system shut-off valve 23Vb.

The first hybrid system connection passage 23Pa is a cooling water passage which connects the device water circulation circuit 22C to the battery water circulation circuit 21C. An end of the first hybrid system connection passage 23Pa is connected to the first battery water circulation passage 21Pa between the battery water shut-off valve 21V and the battery passage 21Pbat. The other end of the first hybrid system connection passage 23Pa is connected to the portion of the first device water circulation passage 22Pa, at which the first circuit connection passage 31Pa is connected to the first device water circulation passage 22Pa.

The first hybrid system shut-off valve 23Va is provided in the first hybrid system connection passage 23Pa. The first hybrid system shut-off valve 23Va is electrically connected to the ECU 90. A set position of the first hybrid system shut-off valve 23Va is controlled by the ECU 90.

When the first hybrid system shut-off valve 23Va is set at an open position, the first hybrid system connection passage 23Pa is open. Thus, the cooling water can flow through the first hybrid system connection passage 23Pa. On the other hand, when the first hybrid system shut-off valve 23Va is set at a closed position, the first hybrid system connection passage 23Pa is shut off. Thus, the cooling water cannot flow through the first hybrid system connection passage 23Pa.

The second hybrid system connection passage 23Pb is a cooling water passage which connects the battery water circulation circuit 21C to the device water circulation circuit 22C. An end of the second hybrid system connection passage 23Pb is connected to the portion of the of the second device water circulation passage 22Pb, at which the second circuit connection passage 31Pb is connected to the second device water circulation passage 22Pb. The other end of the second hybrid system connection passage 23Pb is connected to the second battery water circulation passage 21Pb between the battery pump 21P and the first evaporator 41Ea.

The second hybrid system shut-off valve 23Vb is provided in the second hybrid system connection passage 23Pb. The second hybrid system shut-off valve 23Vb is electrically connected to the ECU 90. A set position of the second hybrid system shut-off valve 23Vb is controlled by the ECU 90.

When the second hybrid system shut-off valve 23Vb is set at an open position, the second hybrid system connection passage 23Pb is open. Thus, the cooling water can flow through the second hybrid system connection passage 23Pb. On the other hand, when the second hybrid system shut-off valve 23Vb is at a closed position, the second hybrid system connection passage 23Pb is shut off. Thus, the cooling water cannot flow through the second hybrid system connection passage 23Pb.

<Circuit Connection Apparatus>

The circuit connection apparatus 30 includes the first circuit connection passage 31Pa, the second circuit connection passage 31Pb, a first circuit shut-off valve 31Va, and a second circuit shut-off valve 31Vb.

The first circuit connection passage 31Pa is a cooling water passage which connects the engine water circulation circuit 11C to the device water circulation circuit 22C. An end of the first circuit connection passage 31Pa is connected to the first engine water circulation passage 11Pa between the engine 110 and the engine shut-off valve 11V. The other end of the first circuit connection passage 31Pa is connected to the first device water circulation passage 22Pa between the device pump 22P and the device shut-off valve 22V. The first circuit connection passage 31Pa includes the evaporator passage 31Pe formed in the second evaporator 41Eb of the heat pump 40. Therefore, the first circuit connection passage 31Pa is provided so as to pass through the second evaporator 41Eb.

The first circuit shut-off valve 31Va is provided in the first circuit connection passage 31Pa. The first circuit shut-off valve 31Va is electrically connected to the ECU 90. A set position of the first circuit shut-off valve 31Va is controlled by the ECU 90.

When the first circuit shut-off valve 31Va is set at an open position, the first circuit connection passage 31Pa is open. Thus, the cooling water can flow into the first device water circulation passage 22Pa from the first engine water circulation passage 11Pa through the first circuit connection passage 31Pa. On the other hand, when the first circuit shut-off valve 31Va is set at a closed position, the first circuit connection passage 31Pa is shut off. Thus, the cooling water cannot flow into the first device water circulation passage 22Pa from the first engine water circulation passage 11Pa through the first circuit connection passage 31Pa.

The second circuit connection passage 31Pb is a cooling water passage which connects the device water circulation circuit 22C to the engine water circulation circuit 11C. An end of the second circuit connection passage 31Pb is connected to the second device water circulation passage 22Pb. The other end of the second circuit connection passage 31Pb is connected to the second engine water circulation passage 11Pb between the engine pump 11P and the engine radiator 11R.

The second circuit shut-off valve 31Vb is provided in the second circuit connection passage 31Pb. The second circuit shut-off valve 31Vb is electrically connected to the ECU 90. A set position of the second circuit shut-off valve 31Vb is controlled by the ECU 90.

When the second circuit shut-off valve 31Vb is set at an open position, the second circuit connection passage 31Pb is open. Thus, the cooling water can flow into the second engine water circulation passage 11Pb from the second device water circulation passage 22Pb through the second circuit connection passage 31Pb. On the other hand, when the second circuit shut-off valve 31Vb is set at a closed position, the second circuit connection passage 31Pb is shut off. Thus, the cooling water cannot flow into the second engine water circulation passage 11Pb from the second device water circulation passage 22Pb through the second circuit connection passage 31Pb.

<System Start-Up Switch>

A system start-up switch 91 is a switch which is operated by the driver of the vehicle 100. The system start-up switch 91 is electrically connected to the ECU 90. As the system start-up switch 91 is set at an ON position by the driver, the ECU 90 enters into a ready state to operate the engine 110 and activate the first motor generator 111 and the second motor generator 112, depending on output power Pdrive requested to be supplied to the drive wheels 170 via the wheel drive shaft 160. On the other hand, as the system start-up switch 91 is set at an OFF position by the driver, the ECU 90 stops operating the engine 110 and activating the first motor generator 111 and the second motor generator 112.

<Heating Switch>

A heating switch 92 is a switch which is operated by the driver of the vehicle 100. The heating switch 92 is electrically connected to the ECU 90. As the heating switch 92 is set at an ON position by the driver while the system start-up switch 91 is set at the ON position, the ECU 90 determines that a heating of the interior of the vehicle 100 is requested. On the other hand, as the heating switch 92 is set at an OFF position by the driver while the system start-up switch 91 is set at the ON position, the ECU 90 determines that the heating of the interior of the vehicle 100 is not requested.

<Sensors>

An engine water temperature sensor 93 is provided at the first engine water circulation passage 11Pa between the outlet of the engine passage 11Pe and the portion of the first engine water circulation passage 11Pa, at which the first circuit connection passage 31Pa is connected to the first engine water circulation passage 11Pa. The engine water temperature sensor 93 is electrically connected to the ECU 90. The engine water temperature sensor 93 detects a temperature of the cooling water flowing out of the engine passage 11Pe and outputs a signal representing the detected temperature to the ECU 90. The ECU 90 acquires the temperature of the cooling water flowing out of the engine passage 11Pe as an engine water temperature Tw_eng on the basis of the signal output from the engine water temperature sensor 93.

A battery water temperature sensor 94 is provided at the second battery water circulation passage 21Pb between the battery passage 21Pbat and the battery pump 21P. The battery water temperature sensor 94 is electrically connected to the ECU 90. The battery water temperature sensor 94 detects a temperature of the cooling water flowing out of the battery passage 21Pbat and outputs a signal representing the detected temperature to the ECU 90. The ECU 90 acquires the temperature of the cooling water flowing out of the battery passage 21Pbat as a battery water temperature Tw_bat on the basis of the signal output from the battery water temperature sensor 94.

<Summary of Operation of Embodiment Apparatus>

Next, a summary of an operation of the embodiment apparatus will be described.

<Operation of Engine, Etc.>

The embodiment apparatus operates the engine 110, activates the second motor generator 112 as the motor, and activates the first motor generator 111 as the motor as is known on the basis of the output power Pdrive requested to be supplied to the drive wheels 170 via the wheel drive shaft 160. In particular, the embodiment apparatus operates the engine 110 without activating the first motor generator 111 and the second motor generator 112 as the motors, activates the first motor generator 111 and/or the second motor generator 112 as the motor(s) without operating the engine 110, or operates the engine 110 and activates the first motor generator 111 and/or the second motor generator 112 as the motor(s), depending on the output power Pdrive requested to be supplied to the drive wheels 170.

<Battery Warming Request>

When the system start-up switch 91 is set at the ON position, the engine 110 is operated, and/or the second motor generator 112 is activated as the motor, depending on the output power Pdrive requested to be supplied to the drive wheels 170.

As described above, the battery 120 supplies the electric power efficiently to the first motor generator 111 and/or the second motor generator 112 when the battery temperature Tbat is maintained at the temperature which is within the predetermined battery temperature range Wbat. When a supply of the electric power from the battery 120 to the first motor generator 111 and/or the second motor generator 112 is started, the battery temperature Tbat increases. In this regard, it may take time for the battery temperature Tbat to reach the temperature which is within the predetermined battery temperature range Wbat. Hereinafter, a process for supplying the electric power from the battery 120 to the first motor generator 111 and/or the second motor generator 112 will be referred to as "a battery power supply process".

When the battery temperature Tbat is previously increased to a certain temperature before an execution of the battery power supply process is started, the battery temperature Tbat may reach the temperature which is within the predetermined battery temperature range Wbat for a shorter time after the execution of the battery power supply process is started. Thereby, the battery 120 can enter promptly into a state that the battery 120 supplies the electric power efficiently to the first motor generator 111 and/or the second motor generator 112 after the execution of the battery power supply process is started.

In addition, when the battery temperature Tbat is previously increased to the temperature which is within the predetermined battery temperature range Wbat before the execution of the battery power supply process is requested, the electric power is supplied efficiently from the battery 120 to the first motor generator 111 and/or the second motor generator 112 immediately after the execution of the battery power supply process is started.

Accordingly, the embodiment apparatus determines that an increase of the battery temperature Tbat is requested, that is, a warming of the battery 120 is requested when the battery water temperature Tw_bat is lower than a predetermined battery water temperature Tw_bat_dan while the system start-up switch 91 is set at the ON position.

The predetermined battery water temperature Tw_bat_dan corresponds to the battery water temperature Tw_bat when the battery temperature Tbat reaches a battery warming end temperature Tbat_dan. The battery warming end temperature Tbat_dan corresponds to a lower limit temperature Tbat_lower of the predetermined battery temperature range Wbat.

<Heater Core Heating Request>

The embodiment apparatus determines that the heating of the interior of the vehicle 100 is requested and thus, a heating of the heater core 12H is requested for increasing a temperature of the heater core 12H when the heating switch 92 is set at the ON position while the system start-up switch 91 is set at the ON position.

In this regard, it may be advantageous that the heater core 12H is previously heated in preparation for the heating switch 92 being set at the ON position, for example, when a temperature of the outside air is low if the system start-up switch 91 is set at the ON position although the heating switch 92 is set on the OFF position. Accordingly, the embodiment apparatus may be configured to determine that the heating of the heater core 12H is requested, independently of the set position of the heating switch 92 when the system start-up switch 91 is set at the ON position.

<Battery Warming/Heater Core Heating>

As described above, the embodiment apparatus determines whether the warming of the battery 120 is requested. In addition, the embodiment apparatus determines whether the heating of the heater core 12H is requested. As a result, when the warming of the battery 120 is requested, the embodiment apparatus can warm the battery 120 by supplying to the battery passage 21Pbat the cooling water heated by the hybrid device 180 while the cooling water flows through the device passage 22Pd. Further, the embodiment apparatus can warm the battery 120 by supplying to the battery passage 21Pbat the cooling water heated by the engine 110 while the cooling water flows through the engine passage 11Pe.

In general, the device temperature Tdev is lower than the engine temperature Teng. Therefore, an increase rate of the battery temperature Tbat when the battery 120 is warmed by supplying the cooling water heated by the hybrid device 180 to the battery passage 21Pbat, is smaller than the increase rate of the battery temperature Tbat when the battery 120 is warmed by supplying the cooling water heated by the engine 110 to the battery passage 21Pbat.

In other words, when the warming of the battery 120 is requested, the battery temperature Tbat is increased to the battery warming end temperature Tbat_dan for a short time when the battery 120 is warmed by supplying the cooling water heated by the engine 110 to the battery passage 21Pbat. Therefore, the battery 120 is desirably warmed by supplying the cooling water heated by the engine 110 to the battery passage 21Pbat in order to increase the battery temperature Tbat to the battery warming end temperature Tbat_dan for a short time.

In this regard, when the temperature of the cooling water heated by the engine 110 is excessively high, the battery temperature Tbat may be increased to a temperature which is higher than the battery warming end temperature Tbat_dan by supplying the cooling water heated by the engine 110 to the battery passage 21Pbat and as a result, the battery 120 may deteriorated thermally.

Therefore, it is desired that the embodiment apparatus increases the battery temperature Tbat to the battery warming end temperature Tbat_dan for a short time, preventing the battery 120 from deteriorating thermally when the battery 120 is warmed by the cooling water heated by the engine 110.

When the heating of the heater core 12H is requested, the embodiment apparatus can heat the heater core 12H by supplying to the heater core passage 12Ph the cooling water heated by the engine 110 while the cooling water flows through the engine passage 11Pe. In this regard, if the cooling water heated by the engine 110 is supplied to the battery passage 21Pbat, the heat of the cooling water heated by the engine 110 is used for warming the battery 120. Thus, time for increasing the temperature of the heater core 12H to a desired temperature may increase.

Therefore, the temperature of the heater core 12H is desirably increased to the desired temperature for a short time when the heater core 12H is heated.

As described above, it is desired that the battery temperature Tbat is increased at a large increase rate, the battery 120 is prevented from deteriorating thermally, and the temperature of the heater core 12H is increased at a large increase rate when the warming of the battery 120 is requested, and the heating of the heater core 12H is requested.

Accordingly, the embodiment apparatus determines whether the engine water temperature Tw_eng is equal to or higher than a minimally-requested water temperature Tw_min when the warming of the battery 120 is requested, and the heating of the heater core 12H is requested.

The minimally-requested water temperature Tw_min is a temperature of the cooling water minimally necessary to increase the battery temperature Tbat by the cooling water flowing out of the engine passage 11Pe and supplied to the battery passage 21Pbat. The minimally-requested water temperature Tw_min is set to a suitable temperature, for example, determined on the basis of a result of an experiment.

Alternatively, an amount of emission included in exhaust gas discharged from the engine 110 increases when the engine temperature Teng is excessively low while the engine 110 operates. Therefore, the minimally-requested water temperature Tw_min used when the engine 110 operates, may be set to the engine water temperature Tw_eng capable of maintaining the amount of the emission included in the exhaust gas discharged from the engine 110 at an amount equal to or smaller than a permitted amount.

<First Control>

The embodiment apparatus executes a first control described below while the engine water temperature Tw_eng is equal to or higher than the minimally-requested water temperature Tw_min, and the battery water temperature Tw_bat is lower than a switching water temperature Tw_sw.

The switching water temperature Tw_sw corresponds to an upper limit of the battery temperature Tbat increased by supplying to the battery passage 21Pbat the cooling water flowing out of the device passage 22Pd. The switching water temperature Tw_sw is set to a suitable temperature of the cooling water, for example, determined on the basis of a result of an experiment.

When the embodiment apparatus executes the first control, the embodiment apparatus sets the first circuit shut-off valve 31Va and the second circuit shut-off valve 31Vb at the closed positions, respectively. In addition, the embodiment apparatus sets the first engine system shut-off valve 13Va and the second engine system shut-off valve 13Vb at the open positions, respectively and sets the engine shut-off valve 11V and the heating shut-off valve 12V at the closed positions, respectively. In addition, the embodiment apparatus activates the engine pump 11P.

Figure 3:
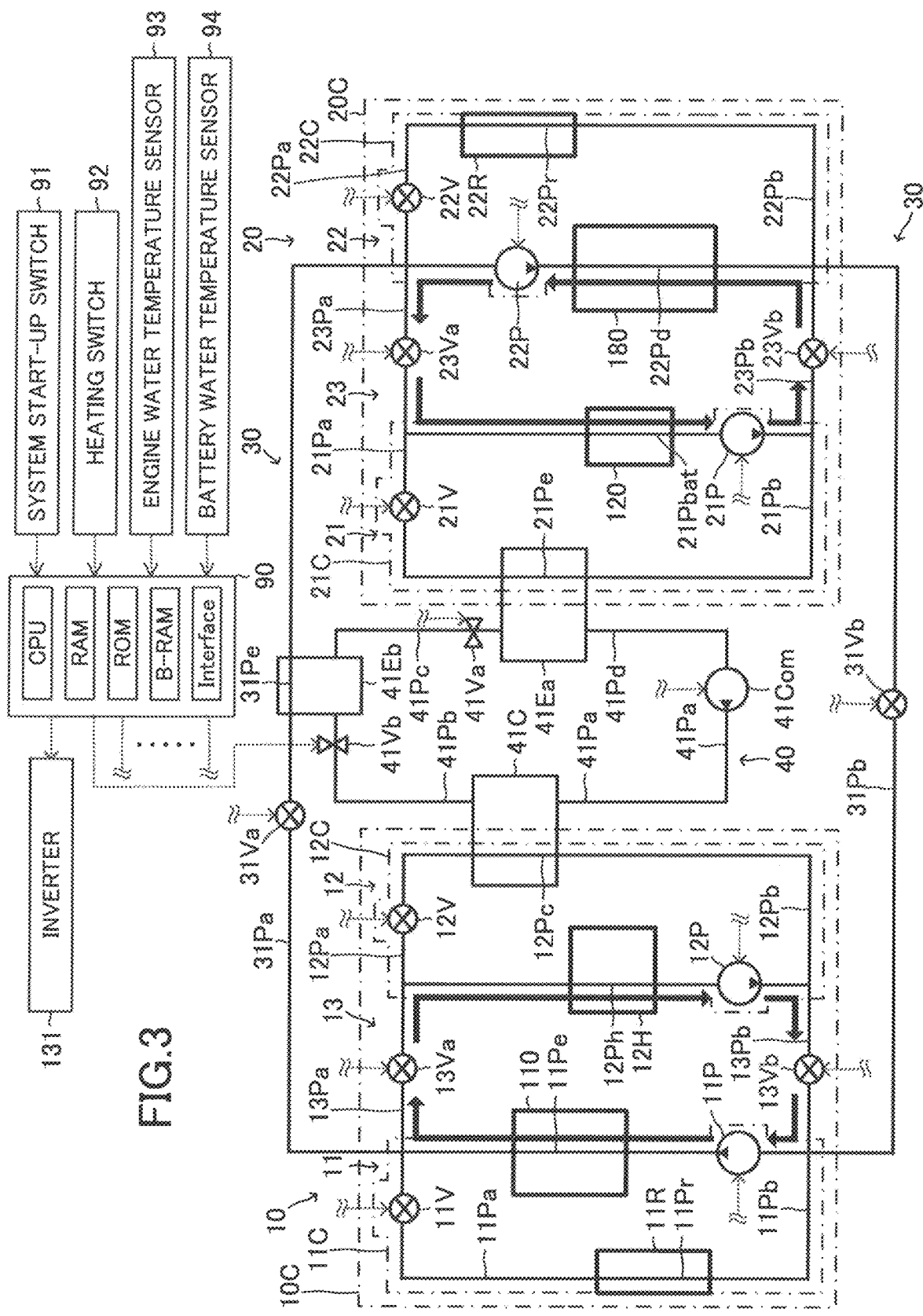
FIG. 3 is a view similar to FIG. 2 and which shows flows of heat exchanging liquid.

Thereby, the cooling water flows in the engine system water circulation circuit 10C as shown in FIG. 3. In particular, the engine pump 11P discharges the cooling water to the second engine water circulation passage 11Pb. The cooling water flows through the second engine water circulation passage 11Pb and then, flows into the engine passage 11Pe. The cooling water is heated by the heat of the engine 110 while the cooling water flows through the engine passage 11Pe.

The cooling water flows through the engine passage 11Pe and then, flows into the first engine water circulation passage 11Pa. Then, the cooling water flows through the first engine water circulation passage 11Pa, the first engine system connection passage 13Pa, and the first heating water circulation passage 12Pa in sequence and then, flows into the heater core passage 12Ph. The cooling water heats the heater core 12H while the cooling water flows through the heater core passage 12Ph. Thereby, the temperature of the heater core 12H increases.

The cooling water flows through the heater core passage 12Ph and then, flows into the second heating water circulation passage 12Pb. Then, the cooling water flows through the second heating water circulation passage 12Pb, the second engine system connection passage 13Pb, and the second engine water circulation passage 11Pb in sequence and then, is suctioned by the engine pump 11P.

Further, when the embodiment apparatus executes the first control, the embodiment apparatus sets the first hybrid system shut-off valve 23Va and the second hybrid system shut-off valve 23Vb at the open positions, respectively and sets the battery shut-off valve 21V and the device shut-off valve 22V at the closed positions, respectively. In addition, the embodiment apparatus activates the battery pump 21P.

Thereby, the cooling water flows in the hybrid system water circulation circuit 20C as shown in FIG. 3. In particular, the battery pump 21P discharges the cooling water to the second battery water circulation passage 21Pb. The cooling water flows through the second battery water circulation passage 21Pb, the second hybrid system connection passage 23Pb, and the second device water circulation passage 22Pb in sequence and then, flows into the device passage 22Pd. The cooling water is heated by the heat of the hybrid device 180 while the cooling water flows through the device passage 22Pd.

The cooling water flows through the device passage 22Pd and then, flows into the first device water circulation passage 22Pa. The cooling water flows through the first device water circulation passage 22Pa, the first hybrid system connection passage 23Pa, and the first battery water circulation passage 21Pa in sequence and then, flows into the battery passage 21Pbat. The cooling water heats the battery 120 while the cooling water flows through the battery passage 21Pbat. Thereby, the battery temperature Tbat increases.

The cooling water flows through the battery passage 21Pbat and then, flows into the second battery water circulation passage 21Pb. The cooling water flows through the second battery water circulation passage 21Pb and then, is suctioned by the battery pump 21P.

The battery temperature Tbat may be increased by the heat generated by the battery 120, for example, when the electric power supply process is executed. In this case, the battery temperature Tbat is increased without the cooling water flowing out of the device passage 22Pd being supplied to the battery passage 21Pbat. Therefore, the embodiment apparatus may be configured not to supply to the battery passage 21Pbat the cooling water flowing out of the device passage 22Pd when the embodiment apparatus executes the first control.

In this case, the switching water temperature Tw_sw is set to an upper limit of the battery water temperature Tw_bat which can be accomplished by the heat of the battery 120.

When the engine 110 operates, the engine water temperature Tw_eng is likely to be equal to or higher than the minimally-requested water temperature Tw_min. Therefore, the embodiment apparatus may be configured to execute the first control while the engine 110 operates, and the battery water temperature Tw_bat is lower than the switching water temperature Tw_sw without determining whether the engine water temperature Tw_eng is equal to or higher than the minimally-requested water temperature Tw_min.

<Second Control>

When the battery water temperature Tw_bat reaches the switching water temperature Tw_sw, the embodiment apparatus stops executing the first control. Then, the embodiment apparatus executes a second control described below when the engine water temperature Tw_eng is equal to or lower than a permitted upper limit water temperature Tw_max.

The permitted upper limit water temperature Tw_max corresponds to an upper limit of the engine water temperature Tw_eng capable of preventing the battery 120 from deteriorating thermally due to the supply of the cooling water flowing out of the engine passage 11Pe to the battery passage 21Pbat. The permitted upper limit water temperature Tw_max is set to a suitable temperature, for example, determined on the basis of a result of an experiment.

When the embodiment apparatus executes the second control, the embodiment apparatus sets the first circuit shut-off valve 31Va and the second circuit shut-off valve 31Vb at the open positions, respectively. In addition, the embodiment apparatus activates the device pump 22P.

In this case, the embodiment apparatus maintains the first engine system shut-off valve 13Va and the second engine system shut-off valve 13Vb at the open positions, respectively and maintains the engine shut-off valve 11V and the heating shut-off valve 12V at the closed positions, respectively. Further, the embodiment apparatus maintains the first hybrid system shut-off valve 23Va and the second hybrid system shut-off valve 23Vb at the open positions, respectively and maintains the battery shut-off valve 21V and the device shut-off valve 22V at the closed positions, respectively.

Figure 4:
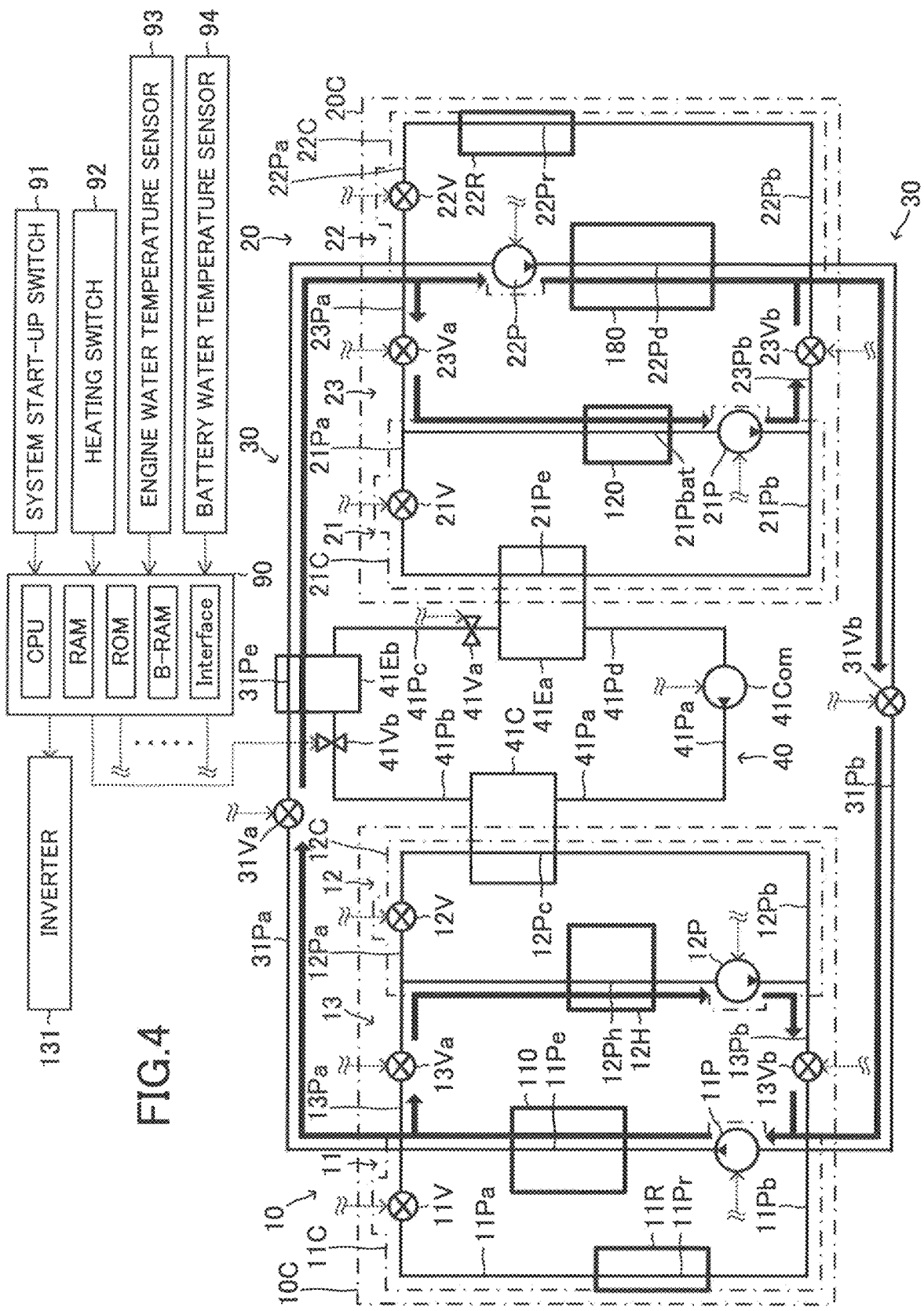
FIG. 4 is a view similar to FIG. 2 and which shows the flows of the heat exchanging liquid.

Thereby, the cooling water flows as shown in FIG. 4. In particular, the engine pump 11P discharges the cooling water to the second engine water circulation passage 11Pb. The cooling water flows through the second engine water circulation passage 11Pb and then, flows into the engine passage 11Pe. The cooling water is heated by the engine 110 while the cooling water flows through the engine passage 11Pe.

The cooling water flows through the engine passage 11Pe and then, flows into the first engine water circulation passage 11Pa. A part of the cooling water flows through the first engine water circulation passage 11Pa, the first engine system connection passage 13Pa, and the first heating water circulation passage 12Pa in sequence and then, flows into the heater core passage 12Ph. The cooling water heats the heater core 12H while the cooling water flows through the heater core passage 12Ph. Thereby, the temperature of the heater core 12H increases.

The cooling water flows through the heater core passage 12Ph and then, flows into the second heating water circulation passage 12Pb. The cooling water flows through the second heating water circulation passage 12Pb, the second engine system connection passage 13Pb, and the second engine water circulation passage 11Pb in sequence and then, is suctioned by the engine pump 11P.

The remaining of the cooling water flowing into the first engine water circulation passage 11Pa from the engine passage 11Pe, flows through the first circuit connection passage 31Pa and then, flows into the hybrid system water circulation circuit 20C. A part of the cooling water flowing into the hybrid system water circulation circuit 20C, flows through the first device water circulation passage 22Pa and then, is suctioned by the device pump 22P.

The device pump 22P discharges the cooling water to the first device water circulation passage 22Pa. The cooling water flows through the first device water circulation passage 22Pa and then, flows into the device passage 22Pd. The cooling water flows through the device passage 22Pd and then, flows into the second device water circulation passage 22Pb. The cooling water flows through the second device water circulation passage 22Pb, the second circuit connection passage 31Pb, and the second engine water circulation passage 11Pb in sequence and then, is suctioned by the engine pump 11P.

The remaining of the cooling water flowing into the hybrid system water circulation circuit 20C from the first circuit connection passage 31Pa flows through the first hybrid system connection passage 23Pa and the first battery water circulation passage 21Pa in sequence and then, flows into the battery passage 21Pbat. The cooling water heats the battery 120 while the cooling water flows through the battery passage 21Pbat. Thereby, the battery temperature Tbat increases.

The cooling water flows through the battery passage 21Pbat and then, flows into the second battery water circulation passage 21Pb. The cooling water flows through the second battery water circulation passage 21Pb and then, is suctioned by the battery pump 21P.

The battery pump 21P discharges the cooling water to the second battery water circulation passage 21Pb. The cooling water flows through the second battery water circulation passage 21Pb, the second hybrid system connection passage 23Pb, the second circuit connection passage 31Pb, and the second engine water circulation passage 11Pb in sequence and then, is suctioned by the engine pump 11P.

As described above, the battery temperature Tbat increases without the cooling water flowing out of the device passage 22Pd being supplied to the battery passage 21Pbat when the battery power supply process is executed and thus, the battery 120 generates the heat. Therefore, the embodiment apparatus may be configured not to supply to the battery passage 21Pbat the cooling water flowing out of the device passage 22Pd when the embodiment apparatus executes the second control.

Also, as described above, when the engine 110 operates, the engine water temperature Tw_eng is likely to be equal to or higher than the minimally-requested water temperature Tw_min. Therefore, the embodiment apparatus may be configured to execute the second control while the engine 110 operates, and the engine water temperature Tw_eng is lower than the permitted upper limit water temperature Tw_max after the battery water temperature Tw_bat reaches the switching water temperature Tw_sw without determining whether the engine water temperature Tw_eng is equal to or higher than the minimally-requested water temperature Tw_min.

<Third Control>

When the engine water temperature Tw_eng is higher than the permitted upper limit water temperature Tw_max, the embodiment apparatus executes a third control described below.

When the embodiment apparatus executes the third control, the embodiment apparatus sets the first circuit shut-off valve 31Va and the second circuit shut-off valve 31Vb at the open positions, respectively. In addition, the embodiment apparatus sets the heating shut-off valve 12V at the open position, activates the device pump 22P and the compressor 41Com, activates the first expansion valve 41Va of the heat pump 40 at the non-decompression mode, and activates the second expansion valve 41Vb at the decompression mode.

In this case, the embodiment apparatus maintains the first engine system shut-off valve 13Va and the second engine system shut-off valve 13Vb at the open positions, respectively and maintains the engine shut-off valve 11V at the closed position. In addition, the embodiment apparatus maintains the first hybrid system shut-off valve 23Va and the second hybrid system shut-off valve 23Vb at the open positions, respectively and maintains the battery shut-off valve 21V and the device shut-off valve 22V at the closed positions, respectively.

Figure 5:
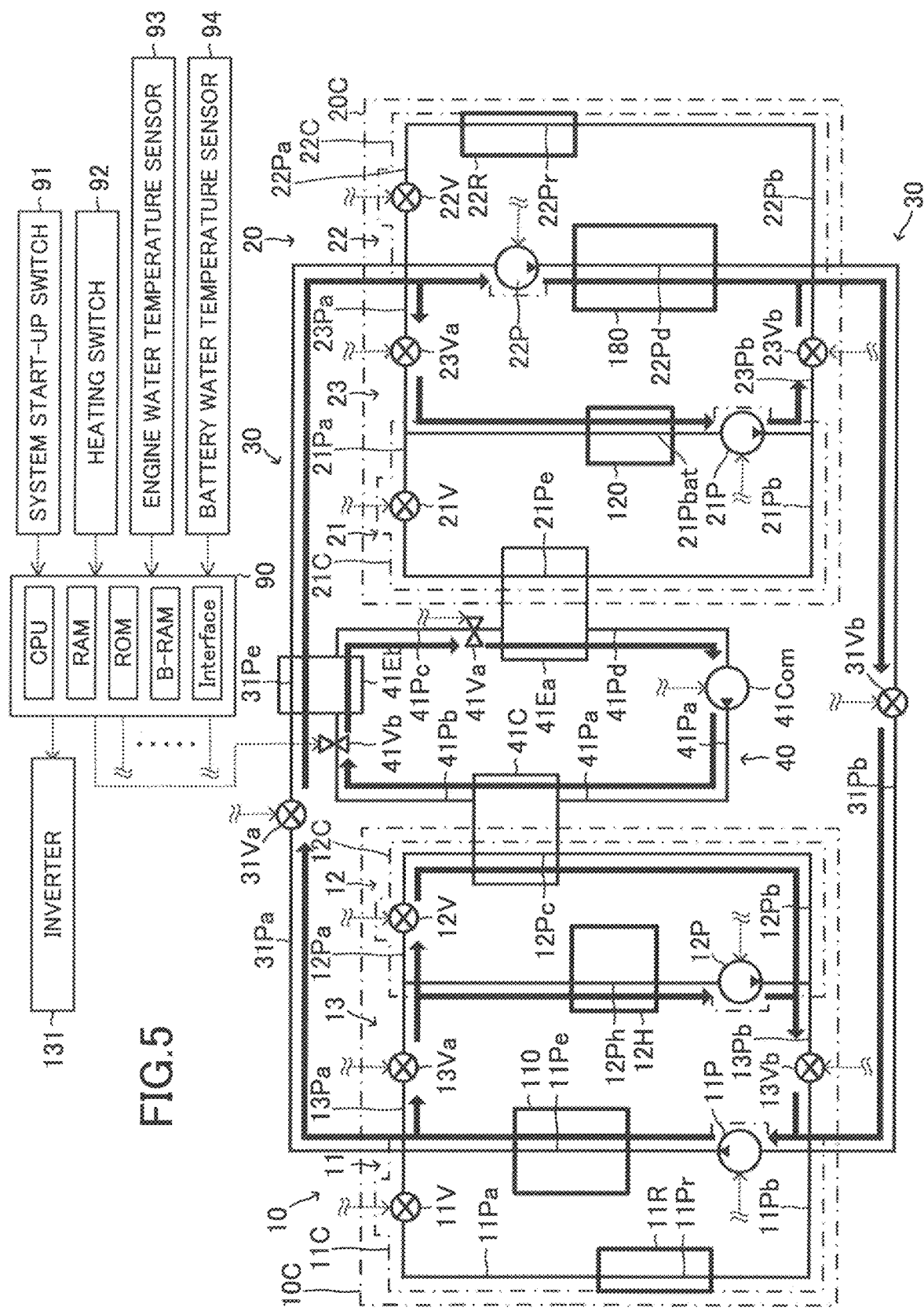
FIG. 5 is a view similar to FIG. 2 and which shows the flows of the heat exchanging and a flow of heat medium.

Thereby, the cooling water flows as shown in FIG. 5. In particular, a part of the cooling water flowing out of the engine passage 11Pe into the first engine water circulation passage 11Pa, flows through the first engine system connection passage 13Pa and then, flows into the heating water circulation circuit 12C. A part of the cooling water flowing into the heating water circulation circuit 12C, flows through the first heating water circulation passage 12Pa and then, flows into the heater core passage 12Ph. The cooling water heats the heater core 12H while the cooling water flows through the heater core passage 12Ph. Thereby, the temperature of the heater core 12H increases.

The cooling water flows through the heater core passage 12Ph and then, flows into the second heating water circulation passage 12Pb. The cooling water flows through the second heating water circulation passage 12Pb, the second engine system connection passage 13Pb, and the second engine water circulation passage 11Pb in sequence and then, is suctioned by the engine pump 11P.

The remaining of the cooling water flowing into the heating water circulation circuit 12C from the first engine system connection passage 13Pa, flows through the first heating water circulation passage 12Pa and then, flows into the condenser passage 12Pc. The cooling water is heated by the condenser 41C while the cooling water flows through the condenser passage 12Pc.

The cooling water flows through the condenser passage 12Pc and then, flows into the second heating water circulation passage 12Pb. The cooling water flows through the second heating water circulation passage 12Pb, the second engine system connection passage 13Pb, and the second engine water circulation passage 11Pb in sequence and then, is suctioned by the engine pump 11P.

The remaining of the cooling water flowing into the first engine water circulation passage 11Pa from the engine passage 11Pe, flows into the first circuit connection passage 31Pa. The cooling water flows through the first circuit connection passage 31Pa and then, flows into the hybrid system water circulation circuit 20C. The cooling water flows through the evaporator passage 31Pe while the cooling water flows through the first circuit connection passage 31Pa. The cooling water is cooled by the second evaporator 41Eb while the cooling water flows through the evaporator passage 31Pe. Thereby, the temperature of the cooling water supplied from the first circuit connection passage 31Pa to the hybrid system water circulation circuit 20C, decreases.

Flow of the cooling water in the hybrid system water circulation circuit 20C when the third control is executed, is the same as the flow of the cooling water in the hybrid system water circulation circuit 20C when the second control is executed.

As described above, the battery temperature Tbat increases without the cooling water flowing out of the device passage 22Pd being supplied to the battery passage 21Pbat when the battery power supply process is executed and thus, the battery temperature Tbat increases by the heat generated by the battery 120. Therefore, the embodiment apparatus may be configured not to supply to the battery passage 21Pbat the cooling water flowing out of the device passage 22Pd when the embodiment apparatus executes the third control.

The summary of the operation of the embodiment apparatus has been described. According to this embodiment, the first control is executed while the battery water temperature Tw_bat is lower than the switching water temperature Tw_sw. In this case, all the cooling water heated by the heat of the engine 110 is supplied to the heater core passage 12Ph. Therefore, the temperature of the heater core 12H increases at the large increase rate.

In addition, an execution of the second control is started when the battery water temperature Tw_bat reaches the switching water temperature Tw_sw. Thereby, a supply of the cooling water heated by the heat of the engine 110 to the battery passage 21Pbat, is started. Thus, the battery temperature Tbat increases at the large increase rate. In addition, the battery 120 is heated by the cooling water heated by the heat of the hybrid device 180 when the first control is executed. Thus, the battery temperature Tbat has increased to a certain temperature (that is, the battery temperature Tbat expected to be accomplished when the battery water temperature Tw_bat reaches the switching water temperature Tw_sw) when the execution of the second control is started. Therefore, the battery temperature Tbat is likely to reach the battery warming end temperature Tbat_dan for a short time by the second control being executed.

After the execution of the second control is started, a part of the cooling water heated by the heat of the engine 110, is supplied to the battery passage 21Pbat. Thus, an amount of the cooling water heated by the heat of the engine 110 and supplied to the heater core passage 12Ph, decreases. In this regard, the heater core 12H is heated by the cooling water heated by the heat of the engine 110 while the first control is executed. Thus, the temperature of the heater core 12H has increased to a certain temperature when the execution of the second control is started. Therefore, the time for the temperature of the heater core 12H to reach the desired temperature, is relatively short even when only a part of the cooling water heated by the heat of the engine 110 is supplied to the battery passage 21Pbat after the execution of the second control is started. Thus, the temperature of the heater core 12H may increase to the desired temperature for a permitted short time.

Further, the third control is executed when the engine water temperature Tw_eng reaches a temperature which is equal to or higher than the permitted upper limit water temperature Tw_max after the battery water temperature Tw_bat reaches the switching water temperature Tw_sw. When the third control is executed, the cooling water heated by the heat of the engine 110 and supplied to the battery passage 21Pbat, is cooled by the second evaporator 41Eb of the heat pump 40. Thus, the battery temperature Tbat can be prevented from increasing to a temperature, at which the battery 120 may deteriorate thermally.

Further, when the third control is executed, the cooling water heated by the heat of the engine 110 and supplied to the battery passage 21Pbat, is cooled by the second evaporator 41Eb of the heat pump 40. Thus, the heat medium of the heat pump 40 is heated in the second evaporator 41Eb. Therefore, a temperature of the heat medium in the condenser 41C increases. As a result, the cooling water flowing through the condenser passage 12Pc of the heating water circulation circuit 12C is heated to a large extent. Therefore, the temperature of the cooling water supplied to the heater core passage 12Ph increases. Thus, the temperature of the heater core 12H is likely to increase to the desired temperature for a short time.

As described above, the battery 120 can be prevented from deteriorating thermally, the battery temperature Tbat can increase to the battery warming end temperature Tbat_dan for a short time, and the temperature of the heater core 12H can increase to the desired temperature for a short time by the first to third controls being executed when the warming of the battery 120 is requested, and the heating of the heater core 12H is requested.

When the engine water temperature Tw_eng is excessively low, the battery temperature Tbat does not increase even by the cooling water flowing out of the engine passage 11Pe being supplied to the battery passage 21Pbat. In this case, the battery temperature Tbat may decreases. In this regard, the embodiment apparatus does not execute the second control nor the third control when the engine water temperature Tw_eng is lower than the minimally-requested water temperature Tw_min. That is, executions of the second and third controls are prohibited when the engine water temperature Tw_eng is lower than the minimally-requested water temperature Tw_min. Therefore, the cooling water is not supplied from the engine passage 11Pe to the battery passage 21Pbat when the engine water temperature Tw_eng is low. Thus, the battery temperature Tbat can be prevented from decreasing.

<Concrete Operation of Embodiment Apparatus>

Below, a concrete operation of the embodiment apparatus will be described. The CPU of the ECU 90 of the embodiment apparatus is configured or programmed to execute a routine shown by a flowchart in FIG. 6 each time a predetermined time elapses while the system start-up switch 91 is set at the ON position.

Figure 6:
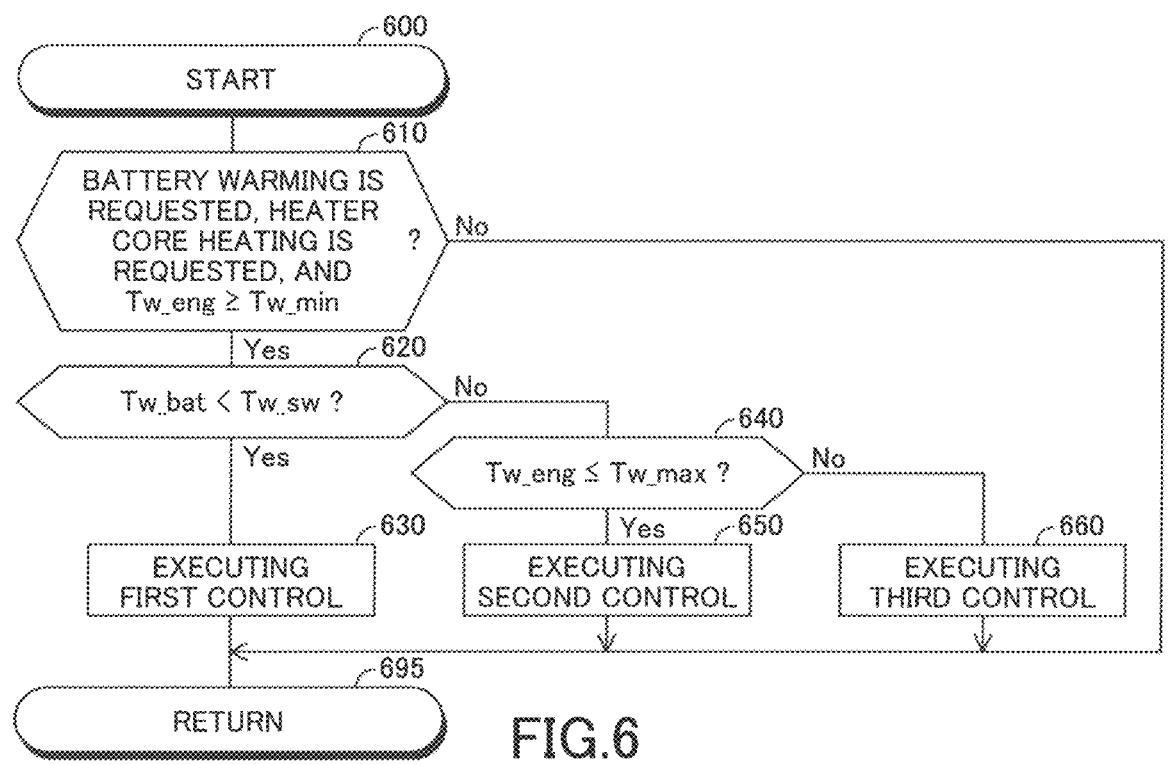
FIG. 6 is a view for showing a flowchart of a routine executed by a CPU of an ECU shown in FIG. 2.

Therefore, at a predetermined timing, the CPU starts a process from a step 600 in FIG. 6 and then, proceeds with the process to a step 610 to determine whether the warming of the battery 120 is requested, the heating of the heater core 12H is requested, and the engine water temperature Tw_eng is equal to or higher than the minimally-requested water temperature Tw_min.

When the warming of the battery 120 is not requested, the heating of the heater core 12H is not requested, or the engine water temperature Tw_eng is lower than the minimally-requested water temperature Tw_min, the CPU determines "No" at the step 610 and then, proceeds with the process to a step 695 to terminate this routine once.

On the other hand, when the warming of the battery 120 is requested, the heating of the heater core 12H is requested, and the engine water temperature Tw_eng is equal to or higher than the minimally-requested water temperature Tw_min, the CPU determines "Yes" at the step 610 and then, proceeds with the process to a step 620 to determine whether the battery water temperature Tw_bat is lower than the switching water temperature Tw_sw.

When the battery water temperature Tw_bat is lower than the switching water temperature Tw_sw, the CPU determines "Yes" at the step 620 and then, proceeds with the process to a step 630 to execute the first control described above. Thereafter, the CPU proceeds with the process to the step 695 to terminate this routine once.

On the other hand, when the battery water temperature Tw_bat is equal to or higher than the switching water temperature Tw_sw, the CPU determines "No" at the step 620 and then, proceeds with the process to a step 640 to determine whether the engine water temperature Tw_eng is equal to or lower than the permitted upper limit water temperature Tw_max.

When the engine water temperature Tw_eng is equal to or lower than the permitted upper limit water temperature Tw_max, the CPU determines "Yes" at the step 640 and then, proceeds with the process to a step 650 to execute the second control described above. Thereafter, the CPU proceeds with the process to the step 695 to terminate this routine once.

On the other hand, when the engine water temperature Tw_eng is higher than the permitted upper limit water temperature Tw_max, the CPU determines "No" at the step 640 and then, proceeds with the process to a step 660 to execute the third control described above. Thereafter, the CPU proceeds with the process to the step 695 to terminate this routine once.

The concrete operation of the embodiment apparatus has been described. When the embodiment apparatus executes the routine shown in FIG. 6, any of the first to third controls is executed, depending on the battery water temperature Tw_bat and the engine water temperature Tw_eng when the warming of the battery 120 is requested, and the heating of the heater core 12H is requested. Therefore, the battery temperature Tbat can increase to the battery warming end temperature Tbat_dan for a short time, the temperature of the heater core 12H can increase to the desired temperature for a short time, and the battery 120 can be prevented from deteriorating thermally.

It should be noted that the present invention is not limited to the aforementioned embodiment and various modifications can be employed within the scope of the present invention.

For example, any of the first circuit shut-off valve 31Va and the second circuit shut-off valve 31Vb may be omitted from the embodiment apparatus. Similarly, any of the first engine system shut-off valve 13Va and the second engine system shut-off valve 13Vb may be omitted from the embodiment apparatus. Similarly, any of the first hybrid system shut-off valve 23Va and the second hybrid system shut-off valve 23Vb may be omitted from the embodiment apparatus.

What is claimed is:

1. A temperature control apparatus of a vehicle, comprising:
    an engine passage formed in an internal combustion engine of the vehicle, heat exchanging liquid flowing through the engine passage;
    a battery passage formed in a battery of the vehicle, the heat exchanging liquid flowing through the battery passage;
    a first passage used for supplying to the battery passage the heat exchanging liquid flowing out of the engine passage;
    a second passage used for returning to the engine passage the heat exchanging liquid flowing out of the battery passage;
    a heat pump provided so as to cool the heat exchanging liquid flowing through the first passage, wherein the battery passage is downstream of the heat pump along the first passage;
    a sensor for measuring a first temperature of the heat exchanging liquid exiting the battery passage, wherein the sensor is in permanent fluid communication with the battery passage; and
    an electronic control unit for controlling flow of the heat exchanging liquid and an activation of the heat pump,
    wherein the electronic control unit is configured to:
    generate a warming of the battery request in response to the measured first temperature being less than a predetermined battery temperature,
    stop activating the heat pump and supply the heat exchanging liquid from the engine passage to the battery passage through the first passage when a first condition including at least generation of the warming of the battery request and a condition that a temperature of the heat exchanging liquid flowing out of the engine passage is equal to or lower than a permitted upper limit temperature, is satisfied; wherein the first condition further includes a condition that the temperature of the heat exchanging liquid flowing out of the engine passage is equal to or higher than a minimally-requested temperature which is lower than the permitted upper limit temperature; and
    activate the heat pump to cool the heat exchanging liquid flowing through the first passage and supply the heat exchanging liquid from the engine passage to the battery passage through the first passage when a second condition including at least generation of the warming of the battery request and a condition that the temperature of the heat exchanging liquid flowing out of the engine passage is higher than the permitted upper limit temperature, is satisfied.

2. A temperature control apparatus of a vehicle, comprising:
    an engine passage formed in an internal combustion engine of the vehicle, heat exchanging liquid flowing through the engine passage;
    a battery passage formed in a battery of the vehicle, the heat exchanging liquid flowing through the battery passage;
    a first passage used for supplying to the battery passage the heat exchanging liquid flowing out of the engine passage;
    a second passage used for returning to the engine passage the heat exchanging liquid flowing out of the battery passage;
    a heat pump provided so as to cool the heat exchanging liquid flowing through the first passage; and
    an electronic control unit for controlling flow of the heat exchanging liquid and an activation of the heat pump,
    wherein the electronic control unit is configured to:
    stop activating the heat pump and supply the heat exchanging liquid from the engine passage to the battery passage through the first passage when a first condition including at least a condition that a warming of the battery is requested and a condition that a temperature of the heat exchanging liquid flowing out of the engine passage is equal to or lower than a permitted upper limit temperature, is satisfied; and activate the heat pump to cool the heat exchanging liquid flowing through the first passage and supply the heat exchanging liquid from the engine passage to the battery passage through the first passage when a second condition including at least the condition that the warming of the battery is requested and a condition that the temperature of the heat exchanging liquid flowing out of the engine passage is higher than the permitted upper limit temperature, is satisfied, wherein the first condition further includes a condition that the temperature of the heat exchanging liquid flowing out of the engine passage is equal to or higher than a minimally-requested temperature which is lower than the permitted upper limit temperature.

3. The temperature control apparatus of the vehicle as set forth in claim 1, wherein the second condition further includes a condition that the temperature of the heat exchanging liquid flowing out of the engine passage is equal to or higher than a minimally-requested temperature which is lower than the permitted upper limit temperature.

4. The temperature control apparatus of the vehicle as set forth in claim 1, wherein the electronic control unit is configured to stop supplying the heat exchanging liquid from the engine passage to the battery passage through the first passage when a third condition including at least a condition that the temperature of the heat exchanging liquid flowing out of the engine passage is lower than a minimally-requested temperature which is lower than the permitted upper limit temperature, is satisfied.

5. The temperature control apparatus of the vehicle as set forth in claim 1, wherein the first condition further includes a condition that a temperature of the heat exchanging liquid flowing out of the battery passage is equal to or higher than a predetermined switching temperature.

6. The temperature control apparatus of the vehicle as set forth in claim 1, wherein the second condition further includes a condition that a temperature of the heat exchanging liquid flowing out of the battery passage is equal to or higher than a predetermined switching temperature.

7. The temperature control apparatus of the vehicle as set forth in claim 1, wherein the electronic control unit is configured to stop supplying the heat exchanging liquid from the engine passage to the battery passage through the first passage when a fourth condition including at least the condition that the warming of the battery is requested and a condition that a temperature of the heat exchanging liquid flowing out of the battery passage is lower than a predetermined switching temperature, is satisfied.

8. The temperature control apparatus of the vehicle as set forth in claim 7, wherein the temperature control apparatus further comprises:
a device passage formed in a device including a motor of the vehicle, the heat exchanging liquid flowing through the device passage;
a third passage used for supplying to the battery passage the heat exchanging liquid flowing out of the device passage; and
a fourth passage used for returning to the device passage the heat exchanging liquid flowing out of the battery passage, and
the electronic control unit is configured to supply the heat exchanging liquid from the device passage to the battery passage through the third passage when the fourth condition is satisfied.

9. The temperature control apparatus of the vehicle as set forth in claim 1, wherein the electronic control unit is configured to stop supplying the heat exchanging liquid from the engine passage to the battery passage through the first passage when a fifth condition including at least a condition that the warming of the battery is not requested, is satisfied.

10. The temperature control apparatus of the vehicle as set forth in claim 1, wherein the temperature control apparatus further comprises:
a heater core passage formed in a heating heater core of the vehicle, the heat exchanging liquid flowing through the heater core passage;
a condenser passage formed in a condenser of the heat pump, the heat exchanging liquid flowing through the condenser passage;
a fifth passage used for supplying to the heater core passage the heat exchanging liquid flowing out of the condenser passage; and
a sixth passage used for returning to the condenser passage the heat exchanging liquid flowing out of the heater core passage,
the second condition further includes a condition that a heating of the heating heater core is requested, and
the electronic control unit is configured to supply the heat exchanging liquid from the condenser passage to the heater core passage through the fifth passage when the second condition is satisfied.

11. The temperature control apparatus of the vehicle as set forth in claim 10, wherein the second condition further includes a condition that the temperature of the heat exchanging liquid flowing out of the engine passage is equal to or higher than a minimally-requested temperature which is lower than the permitted upper limit temperature.

12. The temperature control apparatus of the vehicle as set forth in claim 10, wherein the electronic control unit is configured to stop supplying the heat exchanging liquid from the engine passage to the battery passage through the first passage when a third condition including at least a condition that the temperature of the heat exchanging liquid flowing out of the engine passage is lower than a minimally-requested temperature which is lower than the permitted upper limit temperature, is satisfied.

13. The temperature control apparatus of the vehicle as set forth in claim 10, wherein the first condition further includes a condition that a temperature of the heat exchanging liquid flowing out of the battery passage is equal to or higher than a predetermined switching temperature.

14. The temperature control apparatus of the vehicle as set forth in claim 10, wherein the second condition further includes a condition that a temperature of the heat exchanging liquid flowing out of the battery passage is equal to or higher than a predetermined switching temperature.

15. The temperature control apparatus of the vehicle as set forth in claim 10, wherein the electronic control unit is configured to stop supplying the heat exchanging liquid from the engine passage to the battery passage through the first passage when a fourth condition including at least the condition that the warming of the battery is requested, the condition that the heating of the heating heater core is requested, and a condition that a temperature of the heat exchanging liquid flowing out of the battery passage is lower than a predetermined switching temperature, is satisfied.

16. The temperature control apparatus of the vehicle as set forth in claim 15, wherein the temperature control apparatus further comprises:
a device passage formed in a device including a motor of the vehicle, the heat exchanging liquid flowing through the device passage;

a third passage used for supplying to the battery passage the heat exchanging liquid flowing out of the device passage; and a fourth passage used for returning to the device passage the heat exchanging liquid flowing out of the battery passage, and the electronic control unit is configured to supply the heat exchanging liquid from the device passage to the battery passage through the third passage when the fourth condition is satisfied.

17. The temperature control apparatus of the vehicle as set forth in claim 10, wherein the electronic control unit is configured to stop supplying the heat exchanging liquid from the engine passage to the battery passage through the first passage when a fifth condition including at least a condition that the warming of the battery is not requested, is satisfied.

18. The temperature control apparatus of the vehicle as set forth in claim 10, wherein the temperature control apparatus further comprises:

a seventh passage used for supplying to the heater core passage the heat exchanging liquid flowing out of the engine passage; and an eighth passage used for returning to the engine passage the heat exchanging liquid flowing out of the heater core passage, and the electronic control unit is configured to supply the heat exchanging liquid from the engine passage to the heater core passage through the seventh passage when a condition that the heating of the heating heater core is requested, is satisfied.

19. A vehicle, comprising:

an internal combustion engine;

an engine passage in the internal combustion engine, wherein the engine passage is configured to permit flow of a heat exchanging liquid through the engine passage;

a battery;

a battery passage in the battery, wherein the battery passage is configured to permit flow of the heat exchanging liquid through the battery passage;

a sensor for measuring a first temperature of the heat exchanging liquid exiting the battery passage during an entirety of operation of the vehicle;

a first passage configured to permit flow of the heat exchanging fluid to the battery passage from the engine passage;

a second passage configured to permit flow of the heat exchanging fluid to the engine passage from the battery passage;

a heat pump configured to cool the heat exchanging liquid in the first passage, wherein the heat pump comprises:

a first evaporator connected to the first passage, wherein the first evaporator is connected to the first passage upstream of the battery passage, and a second evaporator separated from the first passage; and a controller for controlling flow of the heat exchanging liquid and the heat pump, wherein the controller is configured to:

generate a warming of the battery request in response to the measured first temperature being less than a predetermined battery temperature;

deactivate the heat pump and induce flow of the heat exchanging liquid from the engine passage to the battery passage through the first passage in response to:

generation of the warming of the battery request, and a determination that a temperature of the heat exchanging liquid flowing out of the engine passage is equal to or higher than a minimally-requested temperature which is lower than a predetermined temperature; and activate the heat pump and induce flow of the heat exchanging liquid from the engine passage to the battery passage through the first passage in response to:

generation of the warming of the battery request, and a determination that the temperature of the heat exchanging liquid flowing out of the engine passage is higher than the predetermined temperature.

* * * * *